(12) United States Patent
Fukushima et al.

(10) Patent No.: US 8,930,823 B2
(45) Date of Patent: Jan. 6, 2015

(54) IMAGE FORMING APPARATUS HAVING DISPLAY DEVICE DISPLAYING FIRST GROUP OF FUNCTIONS INCLUDING FUNCTIONS OF HIGHER FREQUENCY OF USE AND SECOND GROUP OF FUNCTIONS INCLUDING FUNCTIONS OF LOWER FREQUENCY OF USE

(75) Inventors: Tamotsu Fukushima, Osaka (JP); Terumi Hayashi, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 332 days.

(21) Appl. No.: 12/840,077

(22) Filed: Jul. 20, 2010

(65) Prior Publication Data
US 2011/0030050 A1 Feb. 3, 2011

(30) Foreign Application Priority Data
Jul. 28, 2009 (JP) ................. 2009-175101

(51) Int. Cl.
*G06F 3/048* (2013.01)
*G06F 3/12* (2006.01)
*H04N 1/00* (2006.01)
*H04N 1/23* (2006.01)
*G03G 15/00* (2006.01)

(52) U.S. Cl.
CPC ............ *G06F 3/1231* (2013.01); *G06F 3/1204* (2013.01); *H04N 1/00411* (2013.01); *H04N 1/00424* (2013.01); *H04N 1/00464* (2013.01); *H04N 1/00474* (2013.01); *H04N 1/00482* (2013.01); *H04N 1/00517* (2013.01); *H04N 1/2338* (2013.01); *H04N 1/2392* (2013.01); *G03G 15/502* (2013.01); *H04N 2201/0094* (2013.01)
USPC ........................................... 715/745

(58) Field of Classification Search
CPC ............................. G06F 3/1204; G06F 3/1231
USPC ........................................... 715/745
See application file for complete search history.

(56) References Cited

U.S. PATENT DOCUMENTS 6,459,504 B1 * 10/2002 Murano et al. ............... 358/406
7,913,168 B2 * 3/2011 Hoshino et al. ............... 715/273
(Continued)

FOREIGN PATENT DOCUMENTS

JP 7-13732 A 1/1995
JP 7-177215 A 7/1995
(Continued)

OTHER PUBLICATIONS

U.S. Office Action issued in co-pending U.S. Appl. No. 12/805,468 on Mar. 12, 2013.

*Primary Examiner* — William Bashore
*Assistant Examiner* — Henry Orr
(74) *Attorney, Agent, or Firm* — Birch, Stewart, Kolasch & Birch, LLP

(57) ABSTRACT

An image forming apparatus having a plurality of functions and executing a function designated from the plurality of functions includes a display device for displaying a function selection image allowing a user to designate any of the plurality of functions. The display device displays a first group of functions of which frequency of use is higher than a prescribed threshold value, and a second group of functions of which frequency of use is not higher than the threshold value, on mutually different function selection images, with a display item indicating that functions are displayed distinguished from each other. The image forming apparatus further includes: a designating device receiving a user input designating any of the plurality of functions displayed by the display device; and an image forming unit executing the function designated by the input received by the designating device.

14 Claims, 22 Drawing Sheets

(56) References Cited

U.S. PATENT DOCUMENTS

| | | |
|---|---|---|
| 2004/0070627 A1 | 4/2004 | Shahine et al. |
| 2005/0162399 A1* | 7/2005 | Yamada ......................... 345/173 |
| 2005/0281577 A1 | 12/2005 | Tamura et al. |
| 2006/0209690 A1 | 9/2006 | Brooke |
| 2007/0247643 A1* | 10/2007 | Nakamura et al. ............. 358/1.1 |
| 2008/0084580 A1 | 4/2008 | Tamura et al. |
| 2008/0199199 A1 | 8/2008 | Kato et al. |
| 2008/0294983 A1* | 11/2008 | Hoshino et al. ............... 715/273 |
| 2009/0199109 A1* | 8/2009 | Doui ............................ 715/750 |
| 2010/0290068 A1* | 11/2010 | Okada et al. .................. 358/1.9 |
| 2010/0290071 A1* | 11/2010 | Okada et al. ................. 358/1.13 |
| 2010/0290085 A1* | 11/2010 | Okada et al. ................. 358/1.15 |
| 2010/0313163 A1* | 12/2010 | Yamada et al. .............. 715/781 |
| 2011/0007351 A1* | 1/2011 | Kurumasa et al. ........... 358/1.15 |

FOREIGN PATENT DOCUMENTS

| | | | | |
|---|---|---|---|---|
| JP | 8-242278 A | | 9/1996 | |
| JP | 2000-134313 A | | 5/2000 | |
| JP | 2002-162869 A | | 6/2002 | |
| JP | 2002162869 A | * | 6/2002 | ............. G03G 21/00 |
| JP | 2005-102001 A | | 4/2005 | |
| JP | 2005-136468 A | | 5/2005 | |
| JP | 2006-323718 A | | 11/2006 | |
| JP | 2007-136756 A | | 6/2007 | |
| JP | 2008-217417 A | | 9/2008 | |
| JP | 2009-93224 A | | 4/2009 | |
| JP | 2009-130815 A | | 6/2009 | |

\* cited by examiner

FIG. 4

| HISTORY No. | USER ID | USED FUNCTION ||||| DATE & TIME OF USE |
| --- | --- | --- | --- | --- | --- | --- | --- |
| | | FUNCTION ID | LARGE CLASSIFICATION | MIDDLE CLASSIFICATION | SMALL CLASSIFICATION | MINUTE CLASSIFICATION | |
| 001 | 0001 | C0101 | COPY | SPECIAL | MARGIN | (NONE) | |
| 002 | 0121 | C0301 | COPY | FINISH | SORT | (NONE) | |
| 003 | 0061 | C0102 | COPY | SPECIAL | COLOR ADJUSTMENT | RGB ADJUSTMENT | |
| 004 | 0126 | F0101 | FAX | ... | ... | ... | ... |
| 005 | 0100 | D0101 | DOCUMENT | ... | ... | ... | ... |
| 006 | 0056 | C0201 | COPY | DUPLEX COPY | (NONE) | (NONE) | ... |
| 007 | 0033 | C0301 | COPY | FINISH | SORT | (NONE) | ... |
| 008 | 0087 | ... | ... | ... | ... | ... | ... |
| 009 | 0122 | ... | ... | ... | ... | ... | ... |
| ... | ... | | | | | | |

FIG. 5

| FUNCTION ID | MIDDLE CLASSIFICATION | SAVE/NON-SAVE FLAG | SAVED DATE & TIME | SUBMENU SAVED TOGETHER |
|---|---|---|---|---|
| C0101 | SPECIAL FUNCTION | 0 | ... | ... |
| C0102 | SPECIAL FUNCTION | 1 | ... | RGB ADJUSTMENT, COLOR BALANCE, BACKGROUND ERASURE |
| C0103 | SPECIAL FUNCTION | 0 | ... | ... |
| C0104 | SPECIAL FUNCTION | 1 | ... | ... |
| ... | ... | ... | ... | ... |

FIG. 19

COPY | FAX/IMAGE TRANSMISSION | DOCUMENT FILING

USER ID : 0001

FUNCTION RESTORE CONFIRMATION

THE FUNCTION BELOW DESIGNATED TO BE USED IN THE PRESENT JOB SATISFIES RESTORE CONDITIONS (5 DESIGNATIONS BY DIFFERENT USERS). DO YOU WANT TO RESTORE THE FUNCTION AS FREQUENTLY USED FUNCTION?

COLOR ADJUSTMENT

YES: RESTORE

NO: NOT RESTORE (KEEP SAVED)

TO PREVIOUS PAGE

TO NEXT PAGE

IMAGE FORMING APPARATUS HAVING DISPLAY DEVICE DISPLAYING FIRST GROUP OF FUNCTIONS INCLUDING FUNCTIONS OF HIGHER FREQUENCY OF USE AND SECOND GROUP OF FUNCTIONS INCLUDING FUNCTIONS OF LOWER FREQUENCY OF USE

CROSS-REFERENCE TO RELATED APPLICATION

This nonprovisional application claims priority under 35 U.S.C. §119(a) on Patent Application No. 2009-175101 filed in Japan on Jul. 28, 2009, the entire contents of which are hereby incorporated by reference.

BACKGROUND OF THE INVENTION

1. Field of the Invention

The present invention relates to an image forming apparatus forming an image on a recording medium (typically, on a sheet of recording paper) based on image data using, for example, electrophotography. More specifically, the present invention relates to an image forming apparatus having a large number of functions, allowing the user to easily select a desired function from the large number of functions.

2. Description of the Background Art

It has become increasingly common to connect an image forming apparatus having a printer function or a copy function to a network, to allow use by a plurality of users. Further, the number of apparatuses having a plurality of basic functions (modes) such as a copy function, a facsimile function (hereinafter "facsimile" may also be denoted as FAX or fax), a network-supported printer function and a scanner function, such as MFPs (multi-function peripherals), is increasing.

In such a multi-function peripheral, each user selects a basic function (mode) and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Sometimes, a function is selected and for the selected function, a detailed function is further selected. In such a case, we may consider that the function selection menu has a hierarchy. Specifically, when a function of "color adjustment" is selected from a "special function" menu, a menu of a lower layer is displayed, and the user may select a detailed function from the submenu. Here, the menu of lower layer includes, for example, three functions of "RGB adjustment," "color balance" and "background erasure."

In order to meet various and many demands of users, recent image forming apparatuses come to have a larger number of higher functions. As a result, the image forming apparatuses come to have a huge number of functions, resulting in a complicated menu configuration (a hierarchical menu configuration as described above). Further, in addition to the hierarchical menu configuration as described above, a menu belonging to one layer may consist of a plurality of pages. In such a case, it is necessary to find a page having a desired function described thereon from among the plurality of pages and to designate the desired function on the page.

When such a multifunction peripheral (image forming apparatus) is used, for example, it is necessary for the user to perform the following operations. First, the user selects the copy mode. The user inputs image data using a scanner unit. Then, the user carries out various operations on an operation panel to designate desired functions, so that an image forming process (collection or the like) is executed and the result is printed by an image forming unit on a sheet of recording paper. Since the image forming apparatus comes to have higher and larger number of functions, it is necessary for the user to select a desired function from among a huge number of functions.

It is often the case that a user selects one function frequently. For such a user, a menu image (an image allowing selection of functions) includes display of many unnecessary functions. Therefore, the user feels it troublesome to select the desired function, possibly because many menu images including displays of unnecessary functions are displayed before the user reaches a menu image allowing selection of a desired function.

Japanese Patent Laying-Open No. 7-13732 (hereinafter referred to as "'732 Reference") discloses a method of display letting the user know that an icon indicating a program or indicating a combination of a program and data has not been used for a long time, in an information processing system such as a personal computer. According to the icon display method disclosed in '732 Reference, icons are displayed on a display screen. When a user selectively designates a displayed icon, information corresponding to the icon is designated. According to the display method, elapsed time after the last designation of an icon is measured. If the counted time exceeds a first specific time, the manner of display of the icon is changed, to give an alarm. Further, if the measured time exceeds a second specific time longer than the first specific time, the alarm-displayed icon is erased from the display screen.

According to the icon display method, the user can grasp information (icon) not used for a prescribed elapse time. Further, since display of an icon that is not used can be erased from the display screen, the display screen can be used efficiently.

The icon display method disclosed in '732 Reference, however, has the following problem. Specifically, the icon that is not used is eventually not displayed on the display screen. If the user wishes to use the icon again, it is necessary to form the icon again. In other words, simply by deleting information (icon) that is not used for a prescribed time period from the display screen, it is impossible to appropriately meet the demand of the user to use the icon again.

It is unclear whether such a method of icon display can be applied to selection of a function in an image forming apparatus that comes to have a larger number of higher functions. Even if it is applied, what is attained is only an erasure of a function that has not been used for a long time from the selection image. After the display of the function is erased, it is impossible for the user to select the function. Therefore, it is unclear if the application solves the problem of troublesome work in selecting the desired function by the user in an image forming apparatus. In addition, the application possibly leads to inconvenience for the user if he/she wishes to select the function.

If the number of icons (functions of image forming apparatus) increases, it becomes difficult for the user to determine, when an icon is simply erased from the selection image, whether the icon is erased or the icon is not erased but displayed on some other selection image. Therefore, the work of selecting a desired function is still troublesome for the user.

SUMMARY OF THE INVENTION

Therefore, an object of the present invention is to provide an image forming apparatus having various and many functions that are appropriately selected and used by a user, allowing the user to easily select a desired function from among the large number of functions, as well as to provide a method of displaying a function selection image in the image forming apparatus.

The present invention provides an image forming apparatus having a plurality of functions and executing a function designated from the plurality of functions. The image forming apparatus includes a display device displaying a function selection image allowing a user to designate any of the plurality of functions. The display device displays a first group of functions of which frequency of use is higher than a prescribed threshold value, and a second group of functions of which frequency of use is not higher than the threshold value, on mutually different function selection images, with a display item indicating that functions are displayed distinguished from each other. The image forming apparatus further includes: a designating device, connected to the display device, for receiving a user input designating any of the plurality of functions displayed by the display device; and an image forming unit, connected to the designating device, for executing the function designated by the input received by the designating device.

In the image forming apparatus, when one function is designated as a function to be used from a plurality of functions, functions belonging to the first group of high frequency of use and functions belonging to the second group of low frequency of use are displayed on separate function selection images, with display items indicating that the functions are displayed in distinguished manner. Therefore, the user can easily designate a function he/she wants to use. The user can recognize that the functions that are frequently used and the functions that are not frequently used are displayed distinguished from each other and, therefore, the user can easily find and designate a desired function, even if the function is not frequently used. Specifically, in the image forming apparatus, a function selection image, in which the manner of display is changed appropriately reflecting the use history of the user, is displayed in a manner distinguished in accordance with the frequency of designation (use) of each function. As a result, in an image forming apparatus having various and many functions that are appropriately selected and used by a user, the user can easily select a function he/she wants to use from the large number of functions.

According to a second aspect, the present invention provides, in an image forming apparatus having a plurality of functions and executing a function designated from the plurality of functions, a method of displaying a function selection image. The method includes the step of displaying a function selection image allowing a user to designate any of the plurality of functions. The display step displays a first group of functions of which frequency of use is higher than a prescribed threshold value, and a second group of functions of which frequency of use is not higher than the threshold value, on mutually different function selection images, with a display item indicating that functions are displayed distinguished from each other. The method further includes the steps of; receiving a user input designating any of the plurality of functions displayed at the display step; and executing the function designated by the input received at the receiving step and forming an image on a recording medium.

By the image forming apparatus and the method of the present invention, when various and many functions are provided and the functions are appropriately selected and used by the user, the manner of display of the function selection image is changed appropriately reflecting the use history of functions by the user, whereby the user can easily select a desired function from the large number of functions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a function use table stored in image forming apparatus 150.

FIG. 5 shows a function management table stored in image forming apparatus 150.

FIGS. 19 and 20 show images for confirming a function restore.

DETAILED DESCRIPTION OF THE INVENTION

Figure 1:
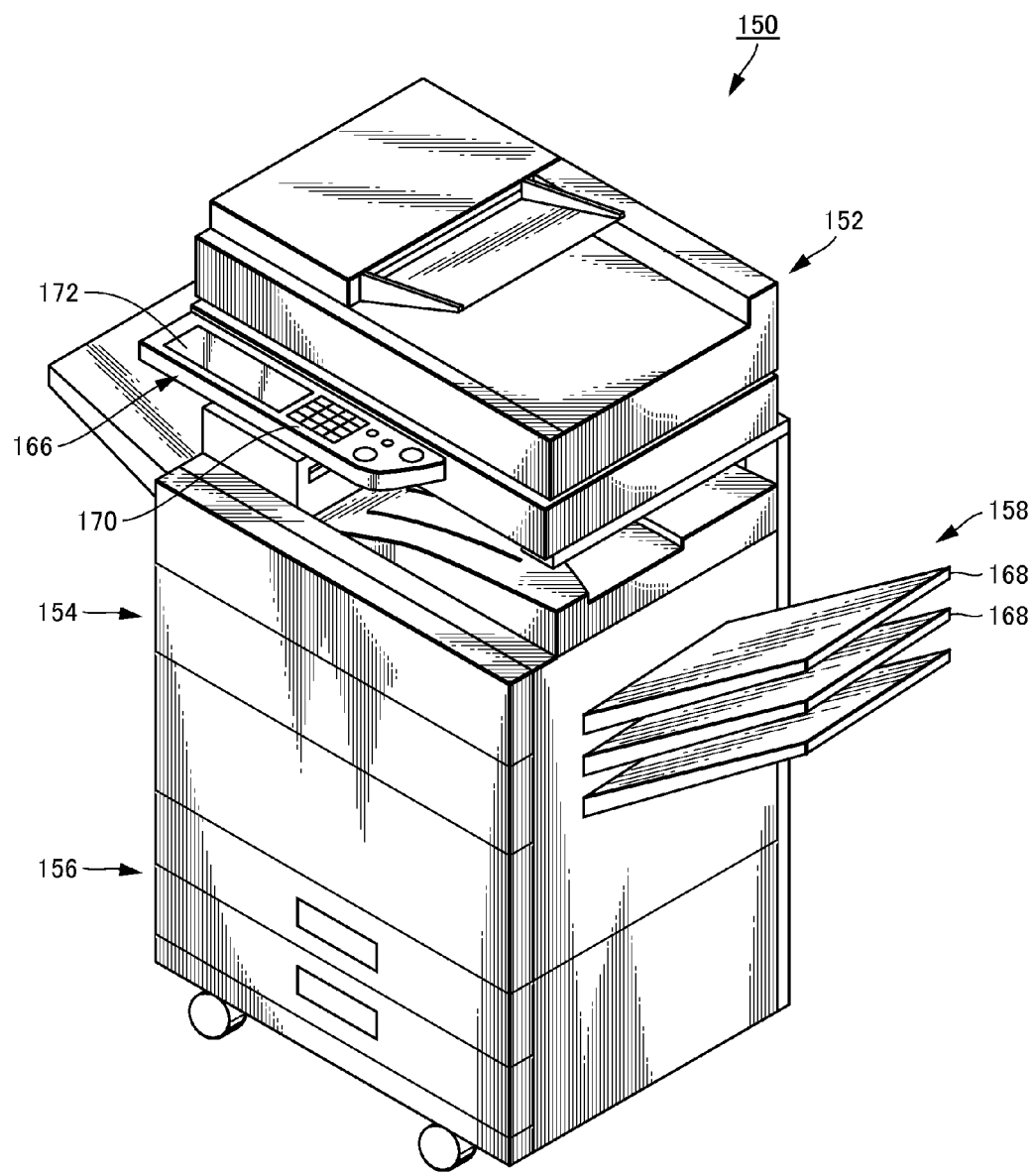
FIG. 1 is a perspective view showing an appearance of an image forming apparatus 150 in accordance with an embodiment of the present invention.

In the following description, the same components are denoted by the same reference characters. Their functions and names are also the same. Therefore, detailed description thereof will not be repeated. In the following description, it is assumed that the image forming apparatus in accordance with the present invention is an MFP. The present invention, however, is not limited thereto. The image forming apparatus may be any device that allows selection of a desired function from a plurality of functions using a menu image (function selection image) displayed on a display panel. In the following description, "facsimile", "fax" and "FAX" are used not specifically distinguished from each other.

[Image Forming Apparatus (Hardware)]

Figure 2:
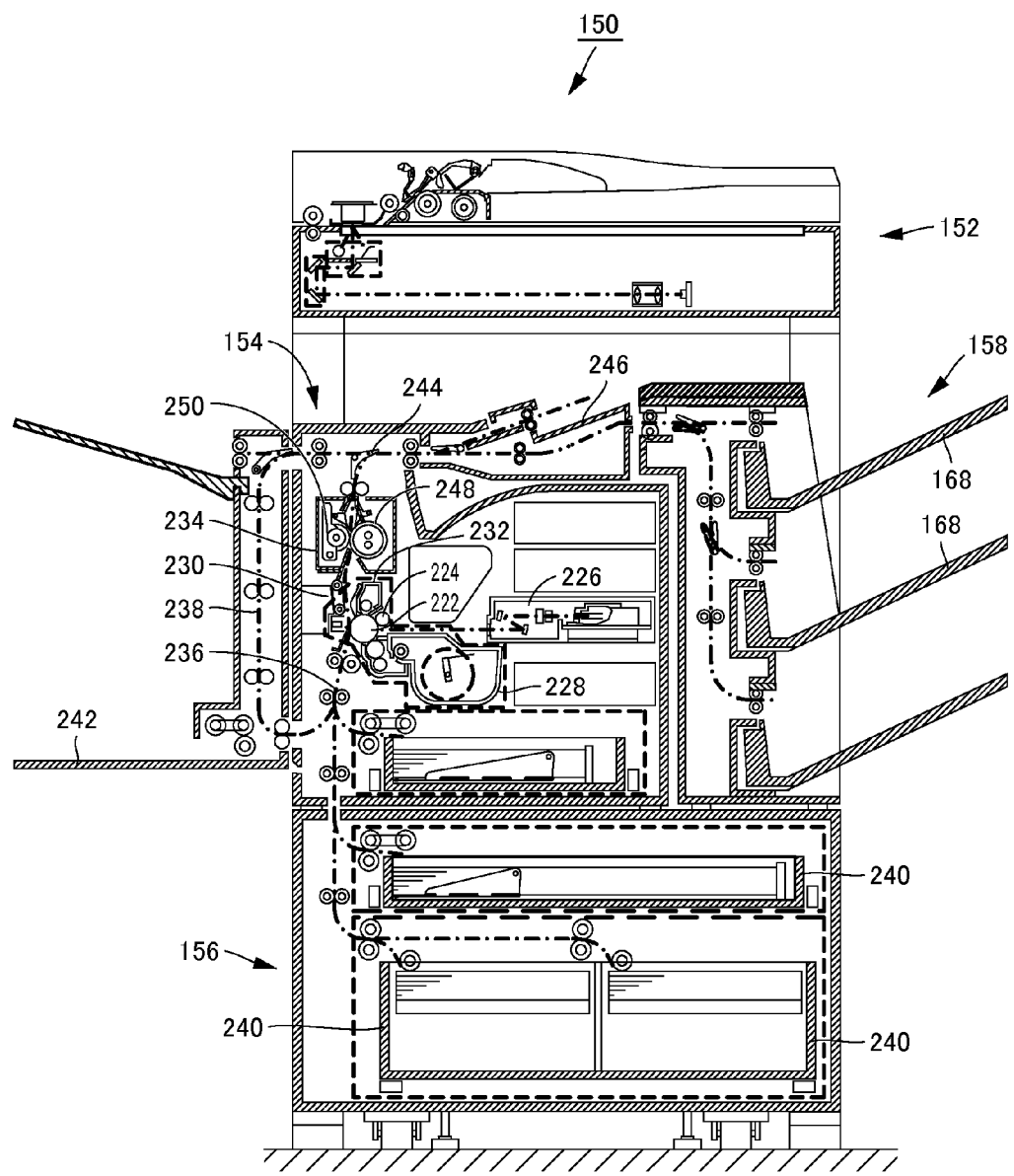
FIG. 2 schematically shows an internal configuration of image forming apparatus 150.

Referring to FIGS. 1 and 2, an image forming apparatus 150 in accordance with an embodiment of the present invention includes a document reading unit 152, an image forming unit 154, a paper feed unit 156, and a discharge processing device 158. In the following, operations in the copy mode, facsimile mode and scanner mode of image forming apparatus (MFP) 150 will be described, as description of internal configuration of image forming apparatus 150. These are basic functions of image forming apparatus 150.

—Copy Mode—

In the copy mode, mainly document reading unit (also referred to as a scanner unit) 152 and image forming unit 154 operate to realize the copy function.

Figure 3:
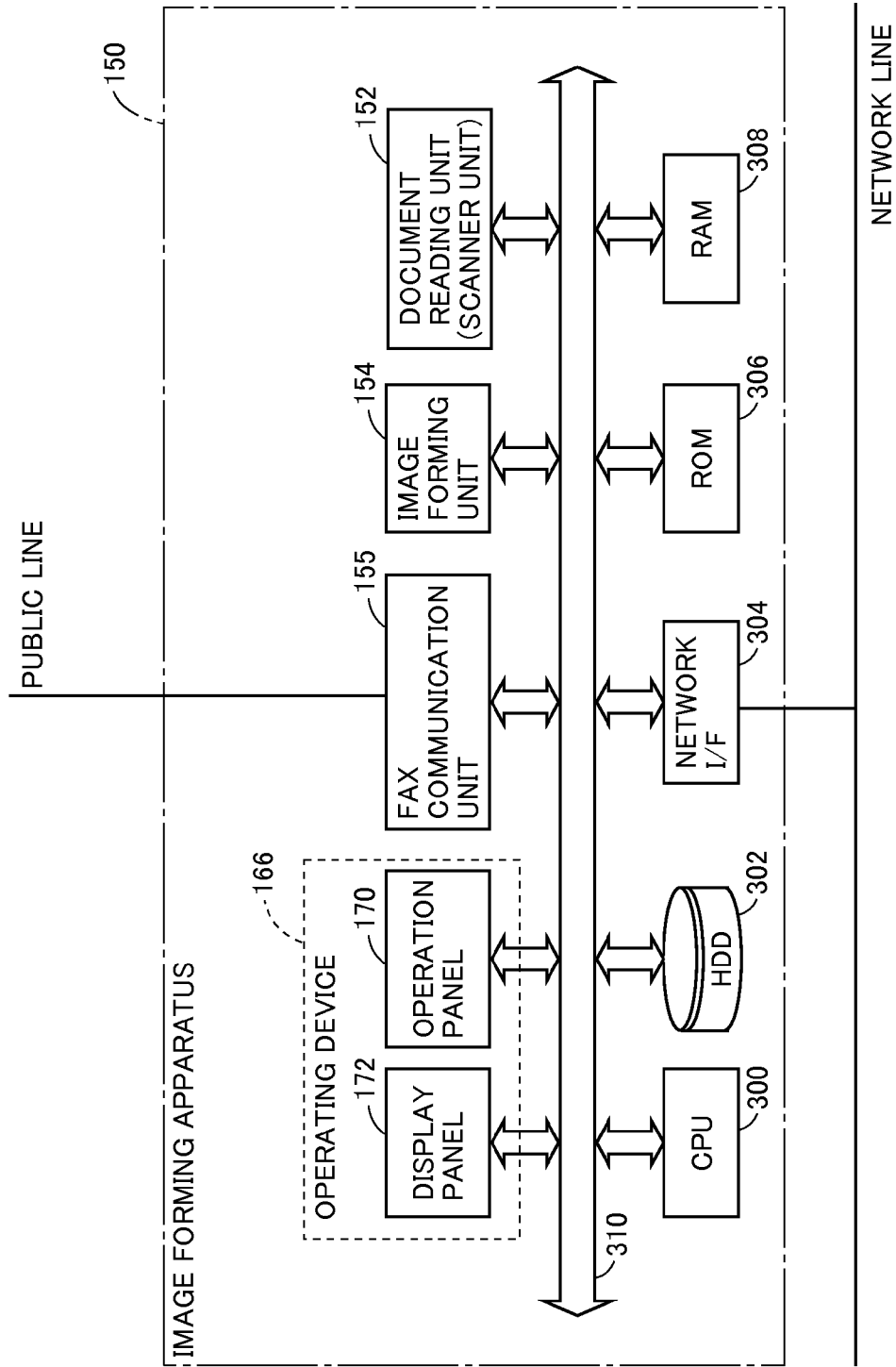
FIG. 3 is a functional block diagram showing hardware configuration of image forming apparatus 150.

In image forming apparatus 150, a document placed on a platen is read by document reading unit 152 as image data, and the read image data is input to CPU 300 implemented, for example, by a microcomputer shown in FIG. 3. In CPU 300, the image data is subjected to various image processing operations by the functions designated by a user logged-in to image forming apparatus 150. The resulting image data is output to image forming unit 154.

Image forming unit 154 is for printing an image of the document represented by the image data on a recording medium (in most case, on a sheet of recording paper). Image forming unit 154 includes, by way of example, a photoreceptor drum 222, a charger 224, a laser scanning unit (hereinafter also denoted as LSU) 226, a developer 228, a transfer device 230, a cleaning device 232, a fixing device 234 and a neutralizer, not shown.

In image forming unit 154, a main feeding path 236 and a reverse feeding path 238 are provided, and a sheet of recording paper fed from paper feed unit 156 is fed along main feeding path 236. Paper feed unit 156 draws out sheets of recording paper stacked on a paper feed cassette 240 or on a manual feed tray 242 one by one, and feeds the sheet of paper to main feeding path 236 of image forming unit 154.

While the sheet of recording paper is fed along main feeding path 236 of image forming unit 154, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250 to heating roller 248, the toner image is fixed on the sheet of recording paper. A heater, not shown, in heating roller 248 is heated by electric power supplied to fixing device 234. By controlling power supply to the heater, the temperature of heating roller 248 is maintained at a temperature appropriate for fixing.

At a position of connection between main feeding path and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or to discharge processing device 158.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path, printing is done on its rear surface.

The sheet of recording paper on which printing is done in the above-described manner is guided to discharge tray 246 or to discharge processing device 158, and discharged to discharge tray 246 or to any of the discharge trays 168 of discharge processing device 158.

In discharge processing device 158, finishing process is executed when a finishing function, which will be described later, is designated. The finishing process includes any of a process of sorting a plurality of printed sheets of paper to be output to different discharge trays 168, a process of punching each sheet of recording paper and a process of stapling the sheets of recording paper, or an arbitrary combination of these processes. Assume that a number of copies of the printing are to be prepared. In that case, sheets of recording paper are sorted and discharged to paper discharge trays 168 such that each tray 168 contains each set of printed sheets (sorting function is designated), and the set of printed sheets in each tray 168 is stapled (stapling function is designated) or punched (punching function is designated), whereby copies of prints are prepared. In addition, a grouping function is also provided for grouping the prints.

—Facsimile Mode—

In the facsimile mode, document reading unit (scanner unit) 152 and a FAX communication unit 155 mainly operate for a transmission operation and FAX communication unit 155 and image forming unit 154 mainly operate for a reception operation, whereby the facsimile function is realized. The operations of image forming apparatus 150 in the Internet facsimile communication mode and the electronic mail communication mode (scan-to-mail) are substantially similar, though the destination is not a FAX number but a computer address or a mail address, or the communication interface is not FAX communication unit 155 but network interface (network IF) 304.

—Transmission Operation

In image forming apparatus 150, the user designates the facsimile mode and places a document on a platen. The document is read by a document reading unit as image data, and the read image data is input to CPU 300 shown in FIG. 3. At CPU 300, the image data is subjected various image processing operations. The resulting image data is output to the FAX communication unit (FAX communication unit 155 of FIG. 3).

FAX communication unit 155 of image forming apparatus 150 on the transmitting side connects a line to a designated transmission destination, converts the image data to communication data in compliance with facsimile transmission standard, and transmits the converted data to a facsimile machine on the receiving side. In the following description, it is assumed that the facsimile machine on the receiving side is also an apparatus of the same type as image forming apparatus 150, and the transmitting and receiving operations of image forming apparatus 150 will be described together.

Communication Operation

When the line is connected, FAX communication unit 155 of image forming apparatus 150 on the receiving side detects a communication request signal from the transmitting side, and transmits an acknowledgement signal. Thereafter, by way of example, FAX communication units 155 of the transmitting side and receiving side pass performance information supported by each other, determine highest possible speed of communication and method of coding/code correction of image data, and set the method of communication of modems. Then, using the image signal format in accordance with the communication method, data is transmitted from FAX communication unit 155 of image forming apparatus 150 on the transmitting side to FAX communication unit 155 of image forming apparatus 150 on the receiving side. When transmission ends, the line is disconnected.

—Reception Operation

FAX communication unit 155 of image forming apparatus 150 on the receiving side converts the received data to image data and passes the data to image forming unit 154. Image forming unit 154 prints an image of a document represented by the image data converted from the received data on a sheet of recording paper, in a manner similar to the operation in the copy mode described above. A configuration in which the received data is converted to image data not by FAX communication unit 155 but by image forming unit 154 is also possible.

—Scanner Mode—

In the scanner mode, mainly by the operation of document reading unit (scanner unit) 152, the scanner function is realized.

A document placed on a platen is read by document reading unit 152 as image data. The read image data is input to CPU 300. The image data is subjected to various image processing operations at CPU 300. Based on the image data, an image is formed on the sheet of recording paper, by image forming unit 154. Alternatively, the image data may be stored in a storage, transmitted to another image forming apparatus connected to a public line through FAX communication unit 155, or may be transmitted to a computer connected to a network, through network IF 304.

In image forming apparatus 150 in accordance with the present embodiment, when any of the various modes (copy mode, facsimile mode and scanner mode, and possibly, printer mode) is selected and the user further selects a function for the selected mode, a menu image appropriately reflecting the use history of the user is displayed on display panel 172. This allows the user to easily select a desired function from among a large number of functions. Specifically, in image forming apparatus 150 in accordance with the present embodiment, in order to enable the user to easily select a desired function, the function selection menu displayed on display panel 172 is maintained.

Such a characteristic is realized by the hardware configuration of image forming apparatus 150 as well as the hardware and software controlling image forming apparatus 150. In the following, first, the hardware configuration (control block) included in image forming apparatus 150 for executing the control will be described, followed by the description of the software configuration (program).

[Image Forming Apparatus (Control Block)]

Referring to FIG. 3, image forming apparatus 150 includes: an operating device 166 allowing settings related to the copy function, facsimile function and scanner function; an ROM (Read Only Memory) 306 for storing programs and the like; a hard disk 302 as a non-volatile storage area capable of storing programs and data; and an RAM (Random Access Memory) 308 for providing a storage area when a program is executed. Various tables described later are stored in hard disk 302, and when the power is turned on, the tables are transferred to RAM 308.

Image forming apparatus 150 further includes a bus 310 connected to document reading unit 152, image forming unit 154, FAX communication unit 155, operating device 166, ROM 306, hard disk 302 and RAM 308, and a CPU 300 connected to bus 310, for realizing general functions as the image forming apparatus.

ROM 306 stores programs and data necessary for controlling operations of image forming apparatus 150. CPU 300 controls image forming apparatus 150 in accordance with the programs and data stored in ROM 306, and executes control related to various functions of image forming apparatus 150.

As shown in FIG. 3, to FAX communication unit 155 of image forming apparatus 150, a public line is connected for transmitting/receiving image data, and to network IF 304, a network line is connected. To the network line, a computer or the like using image forming apparatus 150 as a network-supported printer, or a computer or the like capable of transmitting/receiving a mail through the Internet may be connected.

RAM 308 provides a function of a working memory for temporarily storing results of operations and processes by CPU 300, and a function of a frame memory for storing image data.

Document reading unit 152, image forming unit 154, a flat, plate-shaped operation panel 170 and display panel 172 of operating device 166, ROM 306, hard disk 302 and RAM 308 are controlled by CPU 300 executing a prescribed program.

Operating device 166 includes: a plate-shaped operation panel 170 arranged on the right side on a surface of operating device 166, provided with hardware keys including ten keys and various other operation buttons; and a display panel 172 formed of a small, touch-panel liquid crystal display device, arranged on the central to the left side of operating device 166. Operation panel 170 and display panel 172 are held in one housing, and operating device 166 is formed integrally to be one piece.

On display panel 172 of operating device 166, a state of operation of image forming apparatus 150, a menu and a submenu (a menu of a lower layer than the menu) displaying a plurality of functions allowing the user to select a desired function, a state of saving of functions of low frequency of use and the like are displayed. On a display area of liquid crystal display device of display panel 172, selection buttons are displayed. When a portion where the selection button is displayed is pressed, the pressed position is detected by the touch panel. By comparing the display position of the selection button and the position where the touch panel is pressed using a program, setting of a function or instruction of an operation of image forming apparatus 150 becomes possible.

Here, "saving of functions" means moving a function or functions from a commonly used menu system to another menu system. In the present embodiment, a function or functions of which frequency of use is low are moved from the commonly used menu system to a menu system referred to as a saved menu. As a result, only the menu items of which frequency of use is relatively high are left in the commonly used menu system. If any function is saved, a UI (User Interface) component (typically, a software button) as a display item allowing transition from the commonly used menu image to the saved menu is displayed in the menu. By operating the UI component, it is possible to access to a function included in the saved menu.

For the purpose of function saving described above, in image forming apparatus 150 in accordance with the present embodiment, a history of a function provided by image forming apparatus 150 and used by a user is stored. At certain timing, frequency of use of each function in an immediately preceding prescribed period (in the present embodiment, immediately preceding one month) is calculated based on the history. Based on the result of calculation, a function of which frequency of use is low is saved from the commonly used function selection image (menu image). By way of example, a function of which frequency of use is not higher than a prescribed threshold value (in the present embodiment, 0) is saved. The history is stored in hard disk 302 or RAM 308, and stored as a table including fields as shown in FIG. 4. The table is referred to as a function use table.

Referring to FIG. 4, each row of the function use table includes: a history number (continuous natural number); a field for storing user ID (identified by CPU 300 at the time of log-in); a field for storing a function used by a logged-in user (in the following, referred to as a "used function field"); a field for storing date and time when the function is used (in the following, referred to as a "used date & time field"). The user ID uniquely identifies a user who uses the image forming apparatus 150 (for example, company member number). The history number is allotted to the function in latest-first or oldest-first order of the date and time of use.

The used function field includes: a field for storing a function ID for uniquely identifying a function provided by image forming apparatus 150; and fields for storing large classification, middle classification, small classification and minute classification of the function (hereinafter respectively referred to as "large classification field," "middle classification field," "small classification field" and "minute classification field"). The large classification belongs to the highest layer of hierarchy, and the middle, small and minute classifications belong to lower layers in this order. In FIG. 4, a field containing "NONE" means that the classification of that layer does not exist for the function. Specifically, the functions form layers of hierarchy. The hierarchical layer will be referred to as a "menu layer."

The large classification corresponds to the modes (copy mode, facsimile mode and scanner mode) as the basic functions of image forming apparatus 150. By way of example, in FIG. 4, a function having function ID of "C0102" (the row of history No. 003) corresponds to the large classification of "copy mode," middle classification of "special" (meaning a special function), small classification of "color adjustment" (one of the special functions), and the minute classification of "RGB adjustment" (one sub-function of the color adjustment functions). Such classifications (menu layers) may be stored separately in a table classifying types of functions related to function IDs. In the row of history No. 005, "document" (corresponding to document filing, which will be described later) of the large classification corresponds to a function of storing (scan-to-folder) or transmitting (scan-to-mail) image data scanned in the scanning mode.

In image forming apparatus 150, the functions may simply be classified in hierarchical layers, and the classifications are not limited to the above. In image forming apparatus 150 in accordance with the present embodiment, even when a function is saved, the hierarchical structure of the functions lower than the saved function are maintained. Specifically, when a function is saved, sub-function or sub-functions belonging to the lower layer are also saved, and these functions are displayed reflecting the original hierarchical structure in the saved menu.

A function management table for managing state of saving of each function is stored in hard disk 302 or RAM 308.

Referring to FIG. 5, the function management table uses the function ID shown in FIG. 4 as a key. For each function identified by the function ID, the function management table includes: a field for storing a name or ID of middle classification (hereinafter referred to as "classification field"); a field for storing a flag indicating whether or not the function is saved (hereinafter simply referred to as a "flag"); a field for storing, if the function is in a saved state, the date and time of saving (hereinafter referred to as "saved date & time field"); and a field storing a submenu saved together with the function (hereinafter referred to as a "submenu field"). In the present embodiment, the middle classification is used as the classification of each function. The reason for this is that, in the present embodiment, the saved functions are collected using the middle classification as a unit. Specifically, in the present embodiment, for each middle classification, a function belonging to the middle classification and of which frequency of use is low is saved. By way of example, the saving process performed in the middle classification of "special function" and the saving process performed in the middle classification of "finishing function" are separate processes on different objects, though the contents of processing are the same. It is naturally understood that the function may be saved using the large classification as a unit. In that case, in "classification field" of FIG. 5, the name or ID of large classification of each function is stored.

In the present embodiment, if a function is not saved, "0" is stored, and if the function is saved, "1" is stored, in the flag. Accordingly, a plurality of functions are classified to a first group having the flag=0 and a second group having the flag=1. The values stored in the flag may be reversed. Other values may be used provided that the two states can be distinguished from each other.

In the submenu field, a sub-function or sub-functions belonging to lower layers of a certain function are stored. Referring to FIG. 5, the submenu field will be described using the function identified by the function ID "C0102" as an example. It is assumed that the function, of which large classification is copy mode, middle classification is "special function" and function ID is ID=C0102, is the color adjustment function as a small classification among the special functions. Further, it is assumed that the "RGB adjustment" function, "color balance" function and "background erasure" function belong to a layer lower than the color adjustment function. Here, if the color adjustment function is saved, data meaning that the "RGB adjustment" function, "color balance" function and "background erasure" function are also saved is stored in the submenu field. On the other hand, even if the "background erasure" function as a function belonging to a layer lower than the color adjustment function satisfies conditions to be saved (such conditions for saving a function will be referred to as "saving conditions" in the present specification), unless the "RGB function" and the "color balance function" satisfy the saving conditions, the color adjustment function as the function of an upper layer of these is not saved. Since the function is saved using the middle classification as a unit, together with the small classification units belonging to the lower layer, the hierarchical structure of the saved function and the functions of the lower layer can be maintained.

If certain conditions are satisfied, a saved function is moved from the saved menu back to the commonly used menu. The movement from the saved menu to the commonly used menu will be referred to as "restore." The conditions for restoring a function will be referred to as "restore conditions" in the present specification.

Image forming apparatus 150 includes: a job executing unit processing a job selected by the user from among the large number of functions; an auto saving unit for saving a function that satisfies the saving conditions among the large number of functions; an auto restoring unit for moving (restoring) a saved function that satisfies the restore conditions to the original, commonly used menu image (menu image allowing selection of a function); and a resetting unit for resetting the menu image allowing selection of a function to the initial state. In the initial state, the saved menu is empty. The job executing unit, auto saving unit, auto restoring unit and resetting unit may be implemented in hardware. In the present embodiment, however, these units are implemented by the software described in the following. The job processed by the job executing unit actually executes a function selected by the user in the mode selected by the user.

[Software Configuration]

The programs of which control structures are shown in FIGS. 6 to 9 are subroutine programs, including subroutines of a subroutine. Therefore, when finished, these programs return to a main routine program, not shown.

CPU 300 of image forming apparatus 150 executes, in parallel with such subroutine programs, a program realizing general functions of a computer or an image forming apparatus. The program, however, is not directly related to the characteristic portions of the apparatus in accordance with the present embodiment and, therefore, details thereof will not be described here.

—Job Execution Program—

Figure 6:
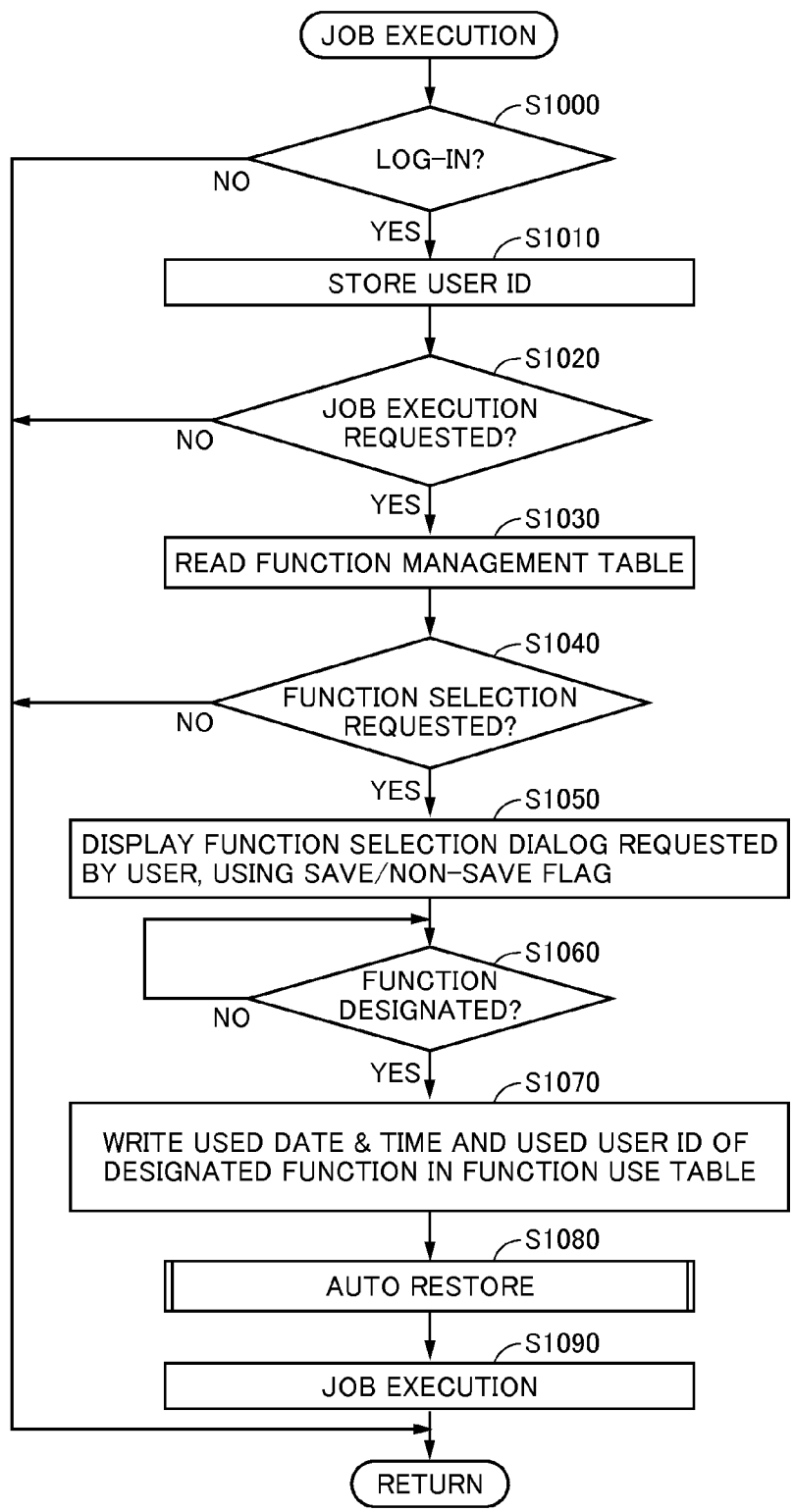
FIG. 6 is a flowchart representing a control structure of a job execution program executed by the image forming apparatus in accordance with an embodiment of the present invention.

Referring to FIG. 6, at step (hereinafter "step" will be denoted as S) 1000, CPU 300 determines whether or not a user of image forming apparatus 150 requested log-in. Here, a dialog urging input of a user ID and a password, or an image for fingerprint input is displayed on display panel 172, and if the user ID and the password are input or biometric information such as the fingerprint of the user is input, CPU 300 determines that the user requested log-in. Based on the user ID and the password or the biometric information of the user, CPU 300 determines whether or not the user who requested log-in is a user registered in an authentication source, and if the user is a registered user, it permits log-in. If CPU 300 permits log-in of the user, the determination at S1000 is positive. If it is determined that the user of image forming apparatus 150 has logged-in (YES at S1000), the process proceeds to S1010. Otherwise (NO at S1000), the process ends. The process may be repeated until a user successfully logs-in.

At S1010, CPU 300 stores the input user ID or a user ID registered in correspondence with the biometric information of the user.

At S1020, CPU 300 determines whether or not the logged-in user requested execution of a desired job, using image forming apparatus 150. It is assumed that image forming apparatus 150 has three modes, that is, copy mode, fax/image transmission mode and document filing mode (it may additionally have the printer mode). If any of software buttons corresponding to the three modes displayed at the uppermost portion of display panel 172 (see FIG. 12) is pressed, CPU 300 determines that a mode is designated by the user. If a mode is designated by the user, CPU 300 determines that a request is made to execute a job. Specifically, CPU 300 determines that switching of an image is requested to enable selection of a function in the designated mode, to execute the job.

If it is determined that a request is made to execute a job (YES at S1020), the process proceeds to S1030. Otherwise (NO at S1020), the process ends.

At S1030, CPU 300 reads the function management table (FIG. 5). With the process of S1030, CPU 300 displays a main menu image (image for selecting the middle classification function) corresponding to the mode selected by the logged-in user, on display panel 172.

At S1040, CPU 300 determines whether or not the user requested selection of a function. By way of example, while a main menu image (function selection image) of the copy mode of image forming apparatus 150 is displayed, when any of the software buttons (for example, "special function" selection button, "duplex copy" selection button, "finishing" selection button and "filing" selection button) corresponding to the four functions (corresponding to the "middle classification" of the function use table shown in FIG. 4) displayed on display panel 172 is pressed, it is determined that the user requested selection of a function. If it is determined that the user requested selection of a function (YES at S1040), the process proceeds to S1050. Otherwise (NO at S1040), the process ends.

At S1050, CPU 300 displays a function selection image including the commonly used menu, for selecting a function from among the functions (middle classification functions) selected by the user, based on the read function management table. Here, functions having "1" stored in the flag of the function management table (FIG. 5) are not displayed on the commonly used menu. Such functions will be the elements of the saved menu, separate from the commonly used menu. Specifically, the commonly used menu displays only the functions that are not saved. The saved menu is a menu displaying only the saved functions. Both in the commonly used menu and in the saved menu, images make transition in accordance with the hierarchical structure described above. When the commonly used menu is displayed, if there is any function not saved in the mode (large classification) selected by the user, the functions not saved (selectable) are displayed on display panel 172 as a list (commonly used menu), and a "to saved functions" button is displayed. When the "to saved functions" button is pressed, the saved functions in the mode (large classification) for the function (middle classification) are displayed as a list (saved menu), on display panel 172. In this manner, functions (small classification) of a function (middle classification, such as special function, duplex copy, finishing and filing) selected after selection of the mode (large classification, including copy mode, facsimile mode and scan mode) are displayed on the commonly used menu or on the saved menu, depending on the state of the flag in function management table (FIG. 5).

At S1060, CPU 300 determines whether or not the user designated a function (whether or not a function of the small classification or, in some cases, whether or not a function of the minute classification is designated). Here, if a function button displayed on display panel 172 is pressed and "OK" button or "previous" button is pressed, CPU 300 determines that the function is designated. If it is determined that the user designated a function (YES at S1060), the process proceeds to S1070. Otherwise (NO at S1060), the process returns to S1060, and waits until it is determined that the user designated a function. In order to avoid an endless loop before any function is designated by the user, preferably, a time-out error process may be performed.

At S1070, CPU 300 writes the date and time of use and the using user ID (logged-in user ID) for the designated function in the management use table.

At S1080, CPU 300 executes the auto-restore process (subroutine). The auto-restore process means the process of moving a function or functions that satisfy restore conditions to the commonly used menu.

Details of the auto-restore function will be described later. At S1090, in the mode selected by the user, CPU 300 executes a job of processing the functions designated by the user.

—Auto-Save Program—

Figure 7:
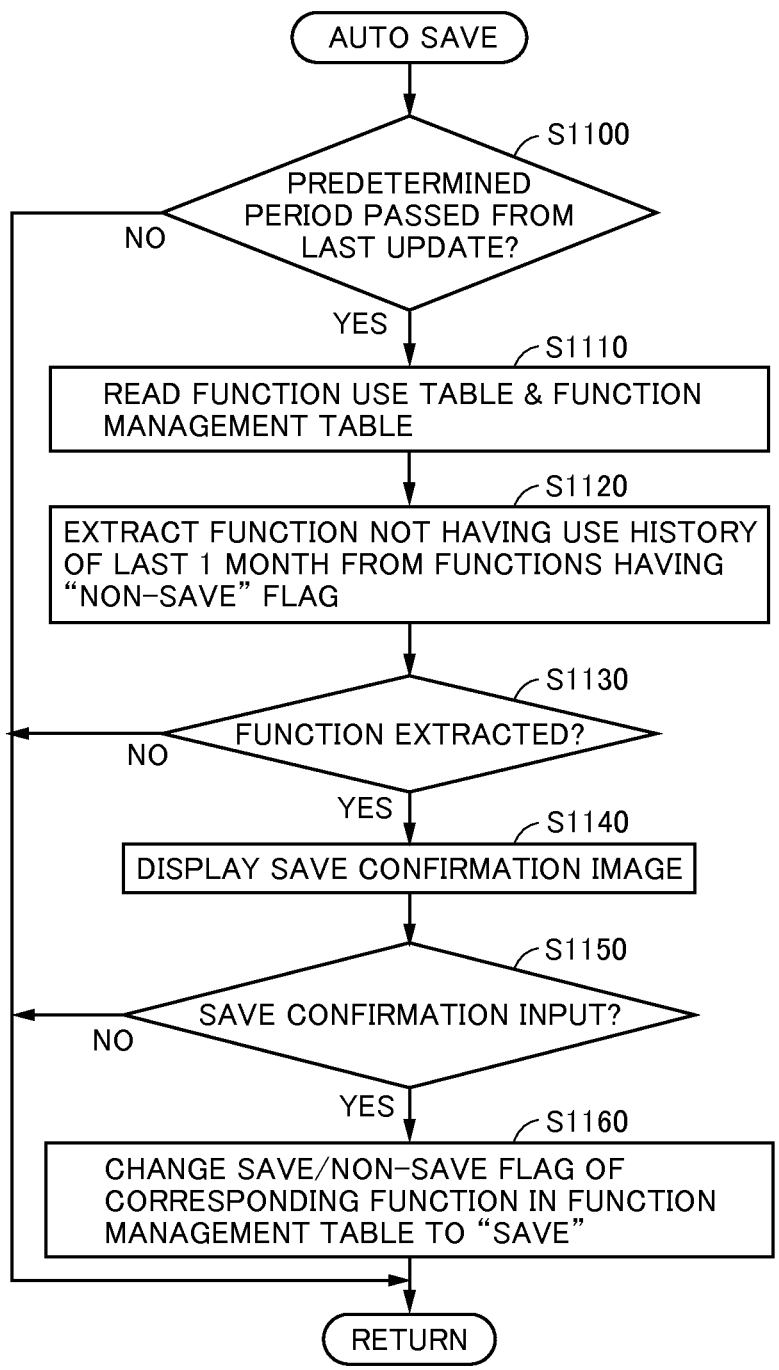
FIG. 7 is a flowchart representing a control structure of an auto-save program.

Referring to FIG. 7, at S1100, CPU 300 determines whether or not a predetermined time period has passed from the last auto-save process (a process of extracting a function of which frequency of use in one month is 0, that is, a function not used, and automatically saving the function). The predetermined time period may be set, for example, to 24 hours. If it is determined that the predetermined time period has passed from the last auto-save process (YES at S1100), the process proceeds to S1110. Otherwise (NO at S1100), the process ends.

At S1110, CPU 300 reads the function use table (FIG. 4) and the function management table (FIG. 5). At S1120, CPU 300 extracts a function or functions having "0" stored in the flag and not used for one month or more from the last use. Here, CPU 300 extracts any function having "0" stored in the flag, for which the date and time of use of the past one month is not stored in FIG. 4.

At S1130, CPU 300 determines whether or not any function is extracted. If any function has been extracted (YES at S1130), the process proceeds to S1140. Otherwise, (NO at S1130), the process ends.

At S1140, CPU 300 displays an image allowing the user to confirm movement of the extracted function as the saved function, on display panel 172.

At S1150, CPU 300 determines whether or not confirmation input is done by the user. Here, on the confirmation image, an approval button and a rejection button for the saving of function are displayed. In this image, if the user presses a button approving saving of the function, CPU 300 determines that the saving is confirmed. If it is determined that the saving is confirmed by the user (YES at S1150), the process proceeds to S1160. Otherwise (NO at S1150), the process ends.

At S1150, CPU 300 stores "1" in the flag of corresponding function in the function management table (FIG. 5). The process steps S1150 and S1160 are executed on all functions extracted by the process of S1120.

—Auto-Restore Program—

Figure 8:
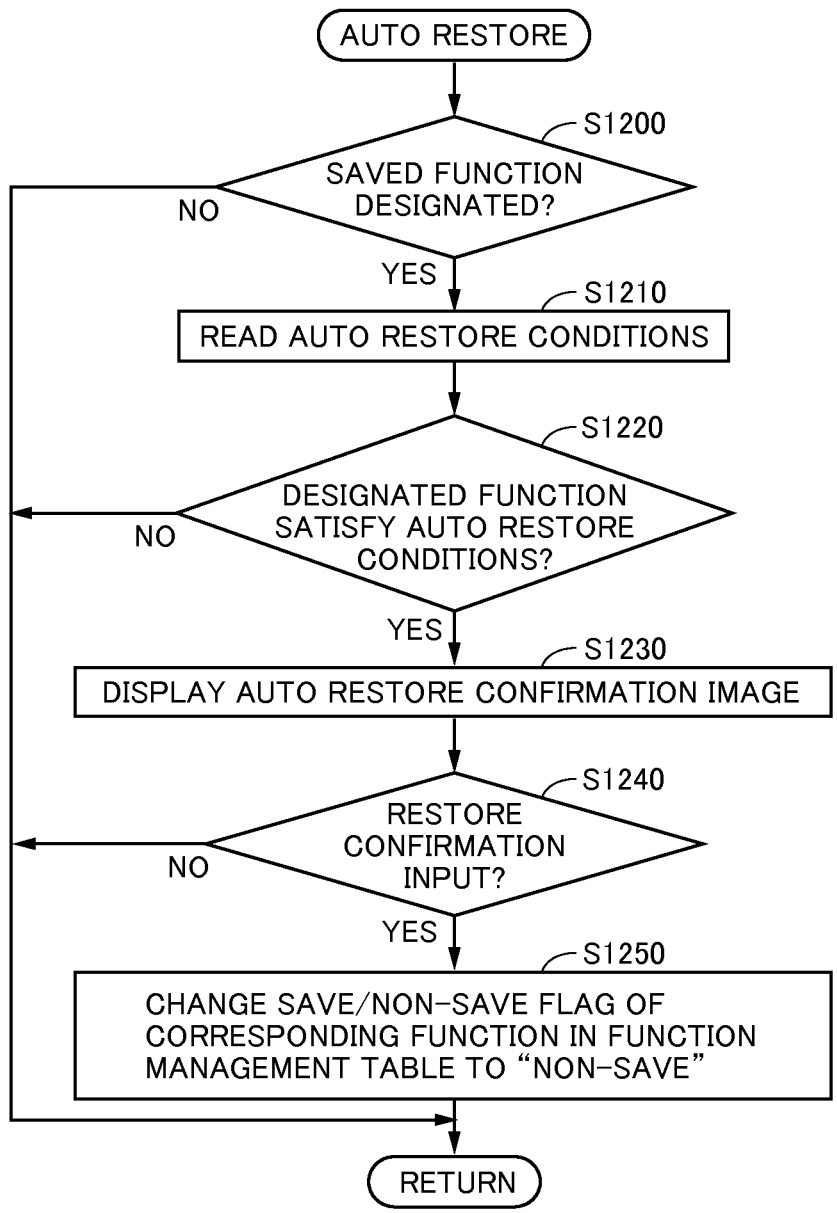
FIG. 8 is a flowchart representing a control structure of an auto-restore program.

Referring to FIG. 8, the control structure of a subroutine program realizing the auto-restore process at S1080 of FIG. 6 will be described. At S1200, CPU 300 determines whether or not a saved function is designated by a user as a function to be used. If it is determined that the user has designated a saved function (YES at S1200), the process proceeds to S1220. Otherwise (NO at S1200), the process ends.

At S1210, CPU 300 reads auto-restore conditions. The auto-restore conditions are set by a system administrator and stored in hard disk 302 or RAM 308. Here, assume that as auto-restore conditions, "one user designated a saved function 10 times," or "unspecified users designated a saved function 5 times," are set. According to the setting, a function designated by different users is restored with smaller number of repeated designations, than a function used repeatedly by one user. Specifically, a function designated by different users is restored with priority, than a function repeatedly used by the same user. When restore conditions for a saved function are satisfied, the function is restored to the original function selection menu. It is also possible to set the number of designations made by a specific user as the auto-restore conditions. If the same number of designations is set for the same user and for unspecified users, it is simply the setting of number, and not the setting of a user or users.

At S1220, CPU 300 determines whether or not a function designated by the user from the saved functions satisfies the auto-restore conditions. The determination may be made based on the use history designated after the date and time of saving, stored in the function use table (FIG. 4). More specifically, as the first restore condition, if the designation of the function by the same user is the 10th designation after the date and time of saving, it is determined that the auto-restore conditions are satisfied. If the first restore condition is not satisfied, the second restore condition is considered. Namely, if the designation of the function by different users is the 5th designation from the date and time of saving, it is determined that the auto-restore conditions are satisfied. If it is determined that either of the auto-restore conditions is satisfied (YES at S1220), the process proceeds to S1230. Otherwise (NO at S1220), the process ends.

At S1230, CPU 300 displays an image allowing the user to confirm restore of the function that satisfies the auto-restore conditions to the original function selection menu, on display panel 172.

At S1240, CPU 300 determines whether or not the user confirmed the restore of the function to the original function selection menu. Here, on the confirmation dialog, buttons allowing the user to approve or reject the restore of function are displayed. If the user presses the button for approving the restore of function in this dialog, CPU 300 determines that restore confirmation is input. If it is determined that confirmation for the restore of the saved function is input by the user (YES at S1240), the process proceeds to S1250. Otherwise (NO at S1240), the process ends.

At S1250, CPU 300 stores "0" in the flag of corresponding function, in the function management table (FIG. 5).

—Resetting Program—

Figure 9:
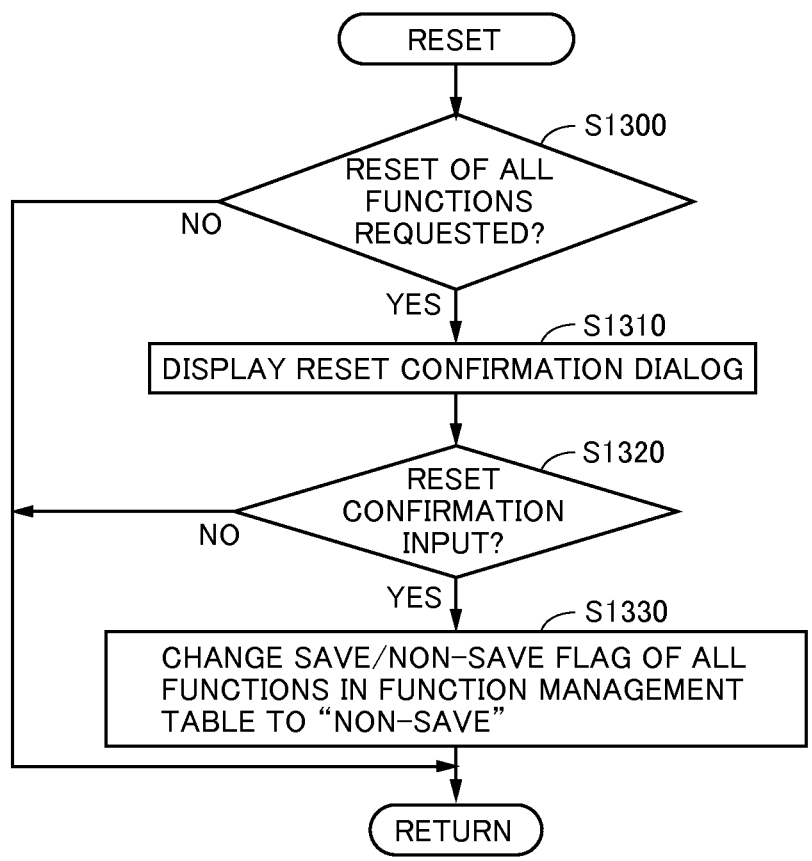
FIG. 9 is a flowchart representing a control structure of a reset program.

Referring to FIG. 9, at S1300, CPU 300 determines whether or not a request for resetting the saved states of all functions to the initial state is detected. At this time, if a "saved function reset" button is pressed, CPU 300 determines that a request for resetting all functions to the initial state is detected. If the determination is positive (YES at S1300), the process proceeds to S1310. Otherwise (NO at S1300), the process ends.

At S1310, CPU 300 displays an image allowing the user to confirm resetting of saved state of all functions to the initial state to have no function saved, on display panel 172.

At S1320, CPU 300 determines whether or not the user confirmed returning of all functions to the initial state. Here, on the confirmation dialog, buttons allowing the user to approve or reject the resetting are displayed. In this dialog, if the button for approving a reset is pressed by the user, CPU 300 determines that the reset is confirmed. If the determination is positive (YES at S1320), the process proceeds to S1330. Otherwise (NO at S1320), the process ends.

At S1330, CPU 300 sets the flag to "0" for all functions (all functions provided by image forming apparatus 150), in the function management table (FIG. 5).

[Operation]

An operation of image forming apparatus 150 in accordance with the present embodiment based on the configuration and flowcharts above will be described with reference to FIGS. 10 to 22.

—System Setting Operation—

Figure 10:
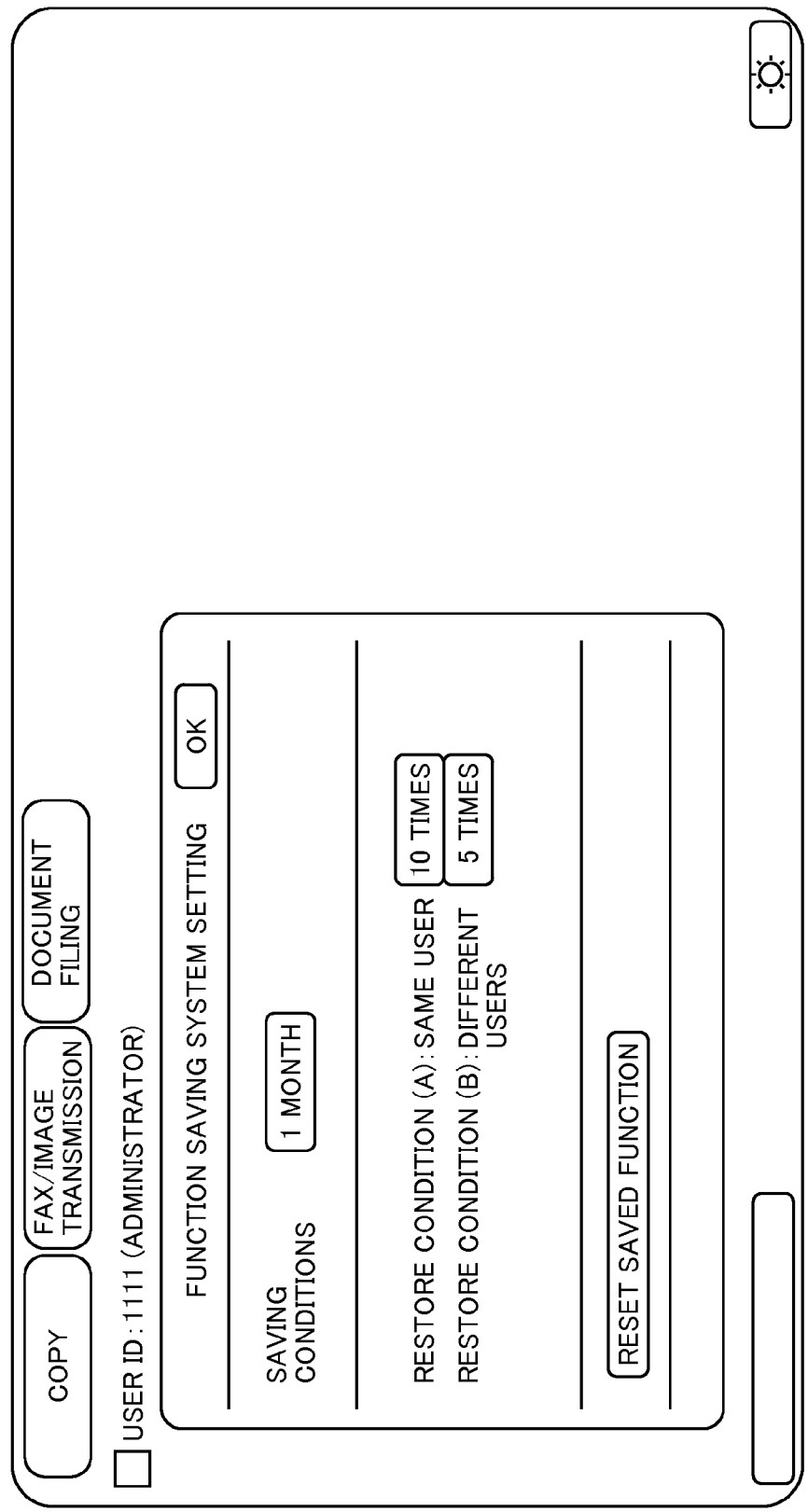
FIG. 10 shows a system setting dialog displayed on a display panel 172 shown in FIG. 3.

FIG. 10 shows a system setting dialog allowing an administrator to input information as to how the functions provided by image forming apparatus 150 are to be managed. The system setting image can be operated only by a user who logged-in as an administrator.

Using the system setting image, the administrator inputs information related to saving of a function from a commonly used menu of the function selection menu to the saved menu of the saved function image, and to restore of a saved function to the original commonly used menu.

Referring to FIG. 10, in the setting image, the system setting items include: saving conditions for saving a function for which a prescribed time period has passed from the date and time of latest use; and restore conditions for automatically restoring a saved function to the original function selection menu image. Here, that the saved function is designated 10 times by the same user is set as the rescore condition (A), and that the saved function is designated 5 times by a plurality of users is set as restore condition (B). Such saving conditions and restore conditions (restore conditions (A) and (B)) are stored in hard disk 302 or in RAM 308.

—Job Executing Operation and Function Auto-Restore Operation—

Figure 11:
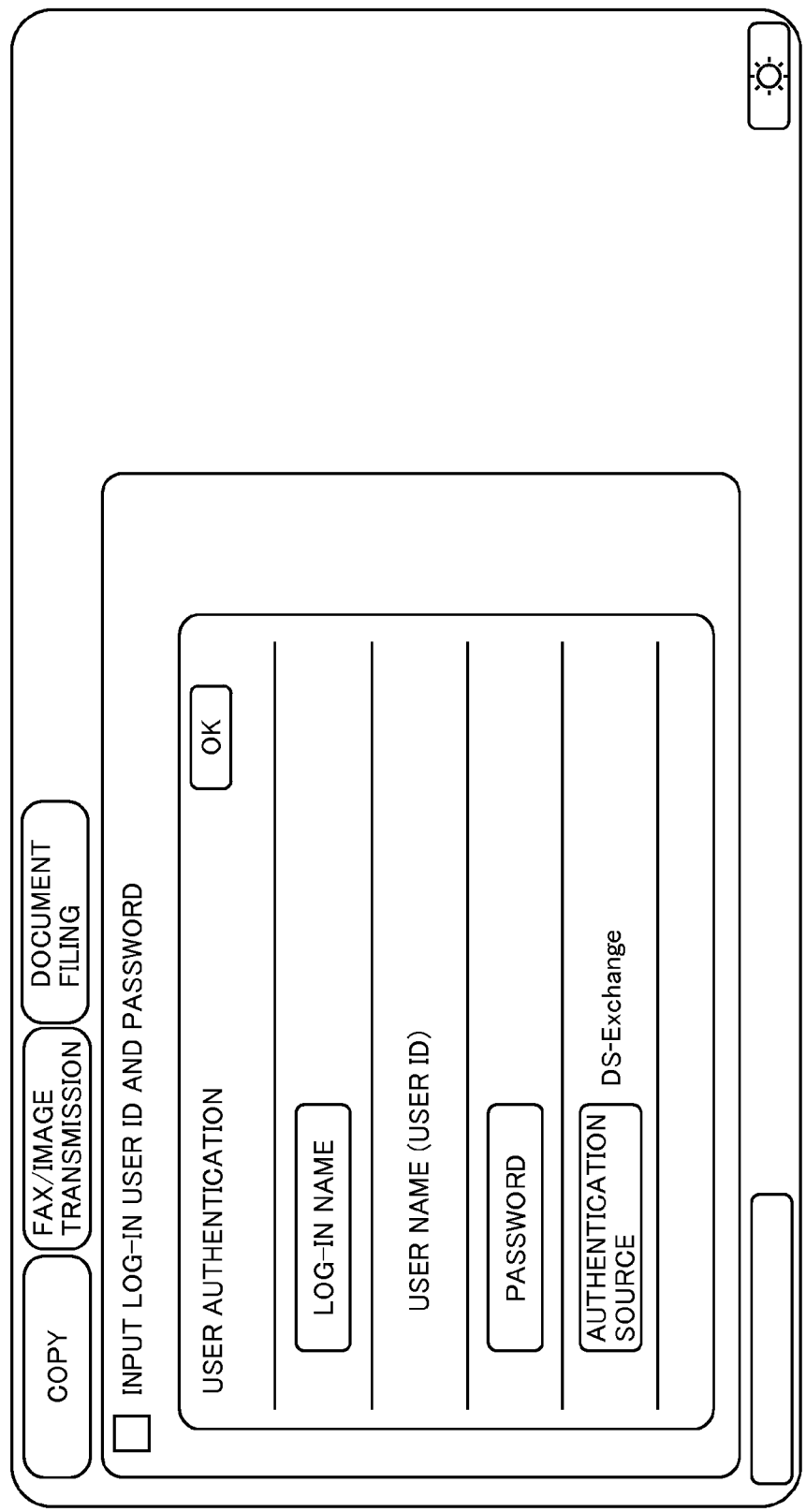
FIG. 11 shows a log-in dialog.

Assume that a user wants to have an image scanned, color image adjusted, and to have the image data printed on a sheet of recording paper (color adjusted copy). On display panel 172 of image forming apparatus 150, the log-in dialog shown in FIG. 11 is displayed. The user inputs appropriate user ID and a password to the log-in name (user ID) field and the password field displayed on the log-in dialog. If the input items have been registered in the authentication source, it is determined that an authorized user has logged-in to image forming apparatus 150 (YES at S1000), and the user ID of the user is stored (S1010). The user ID is kept displayed on display panel 172 while the user is logged-in. At the uppermost portion of initial dialog, a "copy" tag button for selecting the copy mode, a "fax/image transmission" tag button for selecting the facsimile mode, and a "document filing" tag button for selecting the scan mode are displayed.

The logged-in user presses the "copy" tag button among the three tag buttons displayed at the uppermost portion of display panel 172, to have the image data copied (YES at S1020).

Figure 12:
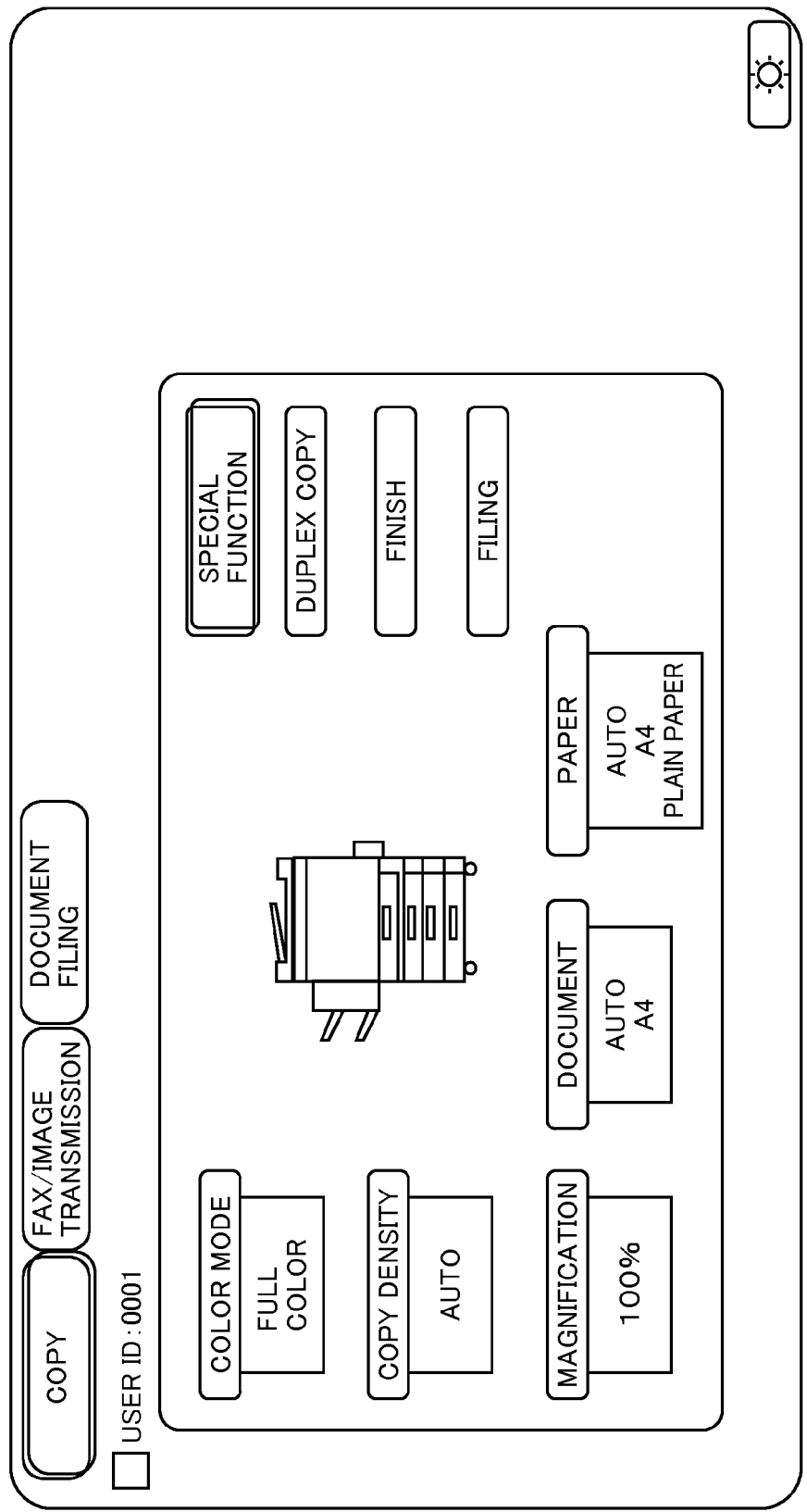
FIG. 12 shows a main menu image when the copy function is selected.

CPU 300 reads the function management table (FIG. 5). At the same time, CPU 300 displays a main menu image (function selection image) for the mode selected by the logged-in user on display panel 172 (S1030). Here, the main menu image in the copy mode shown in FIG. 12 is displayed. As shown in FIG. 12, as software buttons corresponding to functions belonging to the "middle classification" as a lower layer of large classification=copy mode, "special function" selection button, "duplex copy" selection button, "finishing" selection button and "filing" selection button are displayed.

When the user requests selection of a function (for example, if the user presses any of "special function" selection button, "duplex copy" selection button, "finishing" selection button and "filing" selection button) (YES at S1040), based on the read function management table, a function selection image allowing selection of a function (small classification) from the function (middle classification) selected by the user is displayed (S1050). Examples of images displayed on display panel 172 at this time are as shown in FIGS. 13 to 18.

Figure 13:
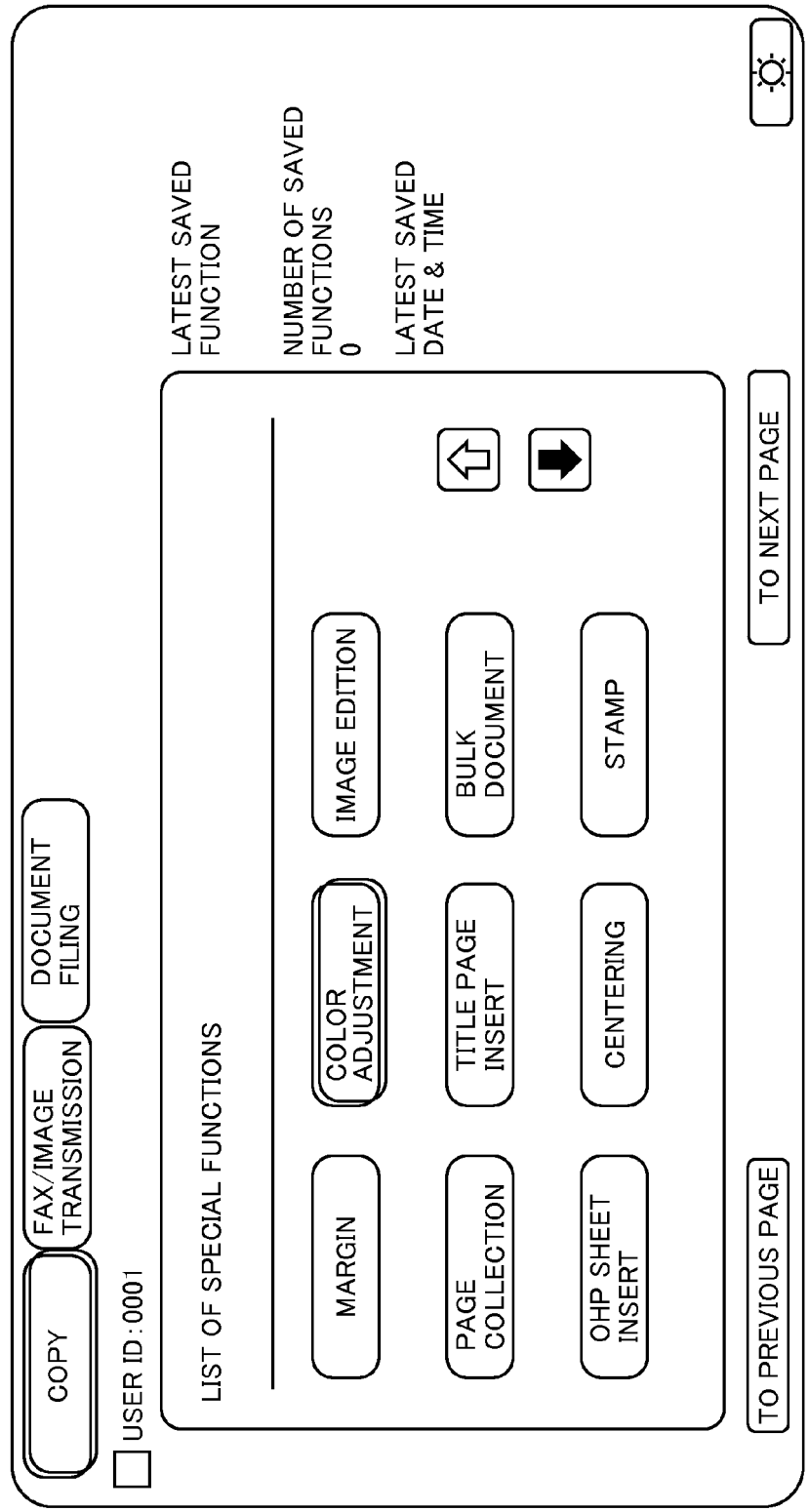
FIG. 13 shows a menu image for selecting a special function for the copy function.
Figure 14:
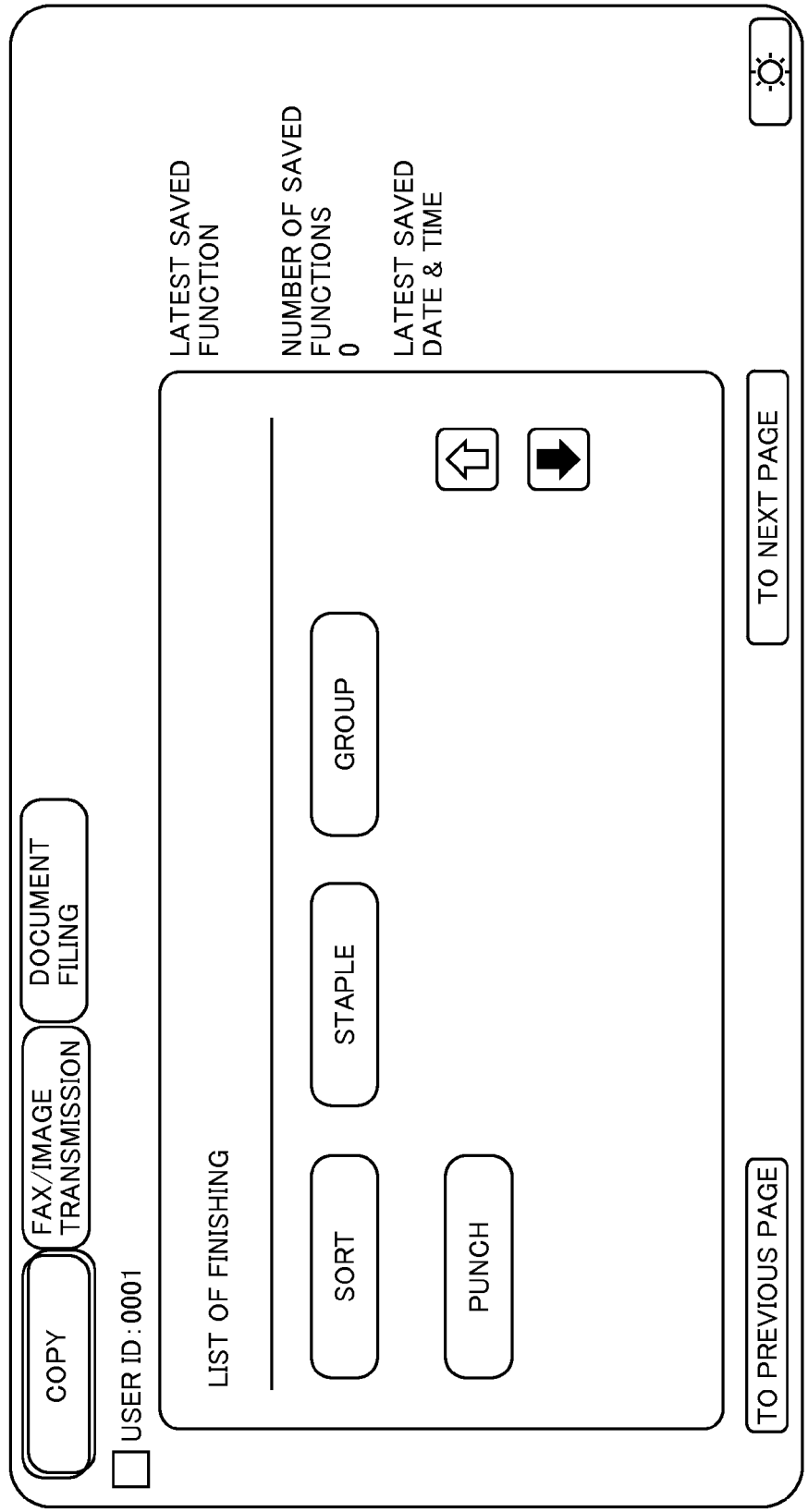
FIG. 14 shows a menu image for selecting a finishing function for the copy function.

FIG. 13 shows an exemplary image displayed on display panel 172 when the user requests selection of a function set as a special function menu (when the user pressed the "special function" selection button). FIG. 14 shows an exemplary image displayed on display panel 172 when the user requests selection of a function set as a finishing function menu (when the user pressed the "finishing" selection button). As shown in FIGS. 13 and 14, on the right side of these images, items "latest saved function", "number of saved functions" and "latest date and time of saving" are displayed. These items indicate the name of the latest saved function, the number of functions saved, and when the latest saving process took place, respectively. Both in FIGS. 13 and 14, no saved function is stored (initial state). It can be recognized that the "to saving function" button is not displayed and the latest saved function and latest date and time of saving are blank and 0 is displayed as the number of saved functions.

If a large number of functions is to be displayed, the list of functions is displayed on a plurality of pages both on the images of FIGS. 13 and 14. Arrows shown at the right end of a frame indicated as "list of special functions" on FIG. 13 are the buttons for moving to other pages.

Figure 15:
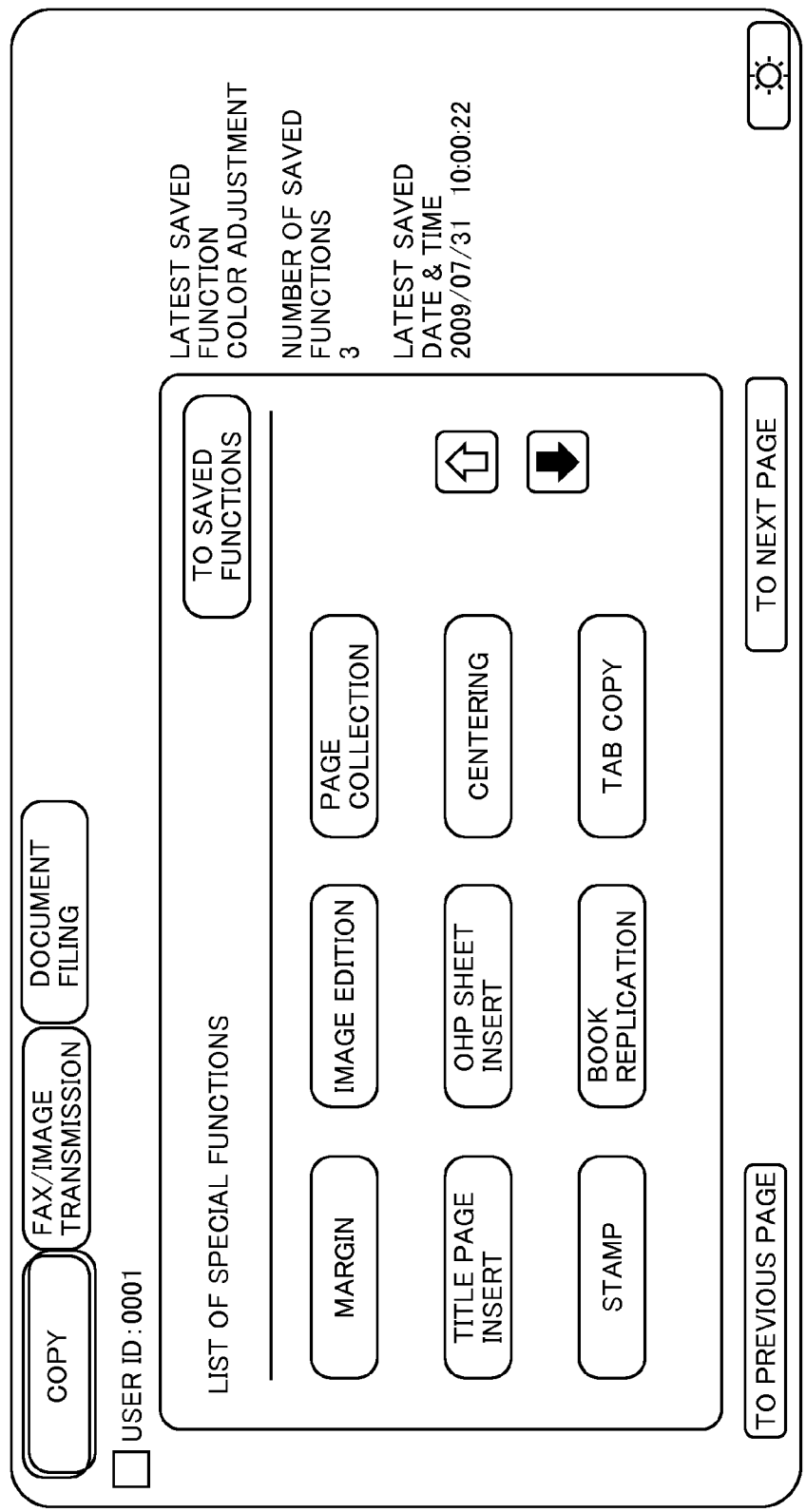
FIG. 15 shows a menu image for selecting a non-saved function among the special functions for the copy function.
Figure 16:
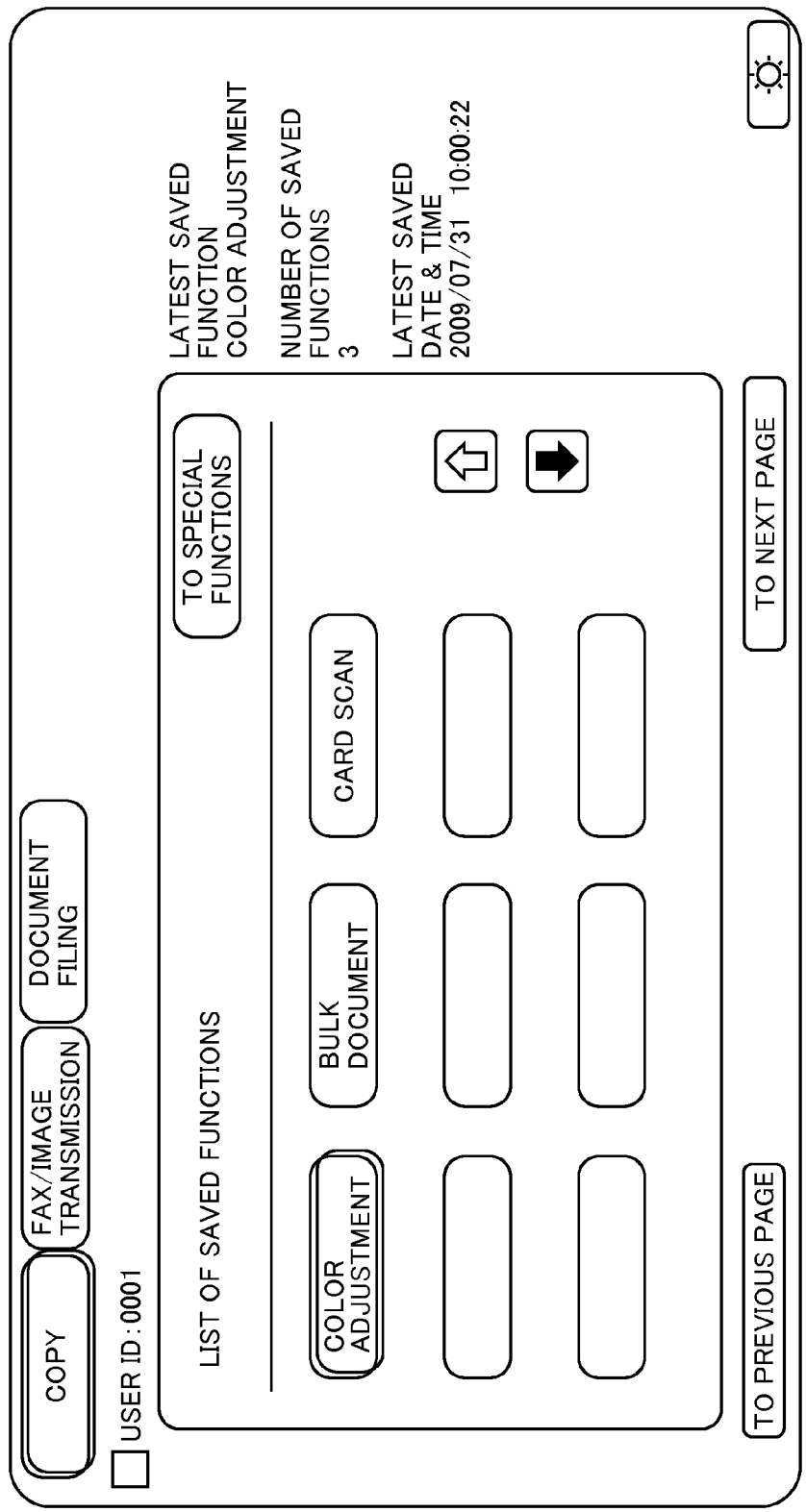
FIG. 16 shows a menu image for selecting a saved function among the special functions for the copy function.

FIGS. 15 and 16 show states when the middle classification is the special function and some of the functions are saved. Specifically, in these figures, some of the functions shown in FIG. 13 are saved. Even when the middle classification is not the special function but the duplex copy function, finishing function or filing function, the display is similar to that described in the following. If some of the functions are saved in the state shown in FIGS. 13 and 14, some of the functions are saved in the corresponding middle classification as shown in FIGS. 15 and 16.

FIG. 15 shows an image displayed on display panel 172 as a commonly used menu of "special functions list" when "color adjustment" and "bulk document" functions among the special functions are saved. FIG. 16 shows an image displayed as "list of saved functions" on display panel 172 when a UI component "to saved functions" is pressed in the image of FIG. 15.

In the image shown in FIG. 15, a list of functions not saved of the displayed middle classification (commonly used menu) is displayed. In the image shown in FIG. 16, a list of saved functions (saved menu) is displayed. Specifically, functions not saved and functions saved are displayed distinguished from each other on separate images.

Following the menu hierarchy in accordance with a common method of operation, one must go through the commonly used menu shown in FIG. 15 before arriving at the saved menu shown in FIG. 16. Therefore, when the user starts from the top menu, the commonly used menu appears preceding the saved menu. Specifically, transition of menus is controlled such that the commonly used menu appears with higher priority than the saved menu. In the example shown in FIGS. 12 to 16, if at least one function is saved among the special functions in the copy mode, the image of FIG. 15 is displayed on display panel 172 when the "copy" tag button of FIG. 12 is pressed, and the image of FIG. 16 is displayed on display panel 172 when the "to saved functions" button of FIG. 15 is pressed. Specifically, FIG. 15 showing the list of not-saved functions is displayed with higher priority than FIG. 16 showing the saved functions.

From the comparison of FIG. 13 with FIG. 15, it can be seen that "color adjustment" function and "bulk document" function displayed in FIG. 13 are not displayed in FIG. 15. Since display of these two functions is removed, "book replication" function and "tab copy" function that are not displayed on FIG. 13 (to be displayed on the next page of FIG. 13) are newly displayed on FIG. 15. Further, in FIG. 15, "3" is displayed as the "number of saved functions" and values corresponding to latest saving process ("color adjustment" and "2009/07/31/10:00:22") are displayed as the latest saved function and the data and time of latest saving. By the display as such, it is possible to efficiently search for a saved function.

Since there are saved functions, "to saved functions" button, which is not displayed in FIG. 13, is displayed in FIG. 15.

In the image shown in FIG. 16, as the special functions, saved "color adjustment" function, "bulk document" function and "card scan" function are displayed. In FIG. 16, a caption "list of saved functions" indicating that the image of FIG. 16 is a list of saved functions is displayed, and in place of "to saved functions" button shown in FIG. 15, a "to special functions" button, for making an image transition to the image of list of special functions (FIG. 15) is displayed. In the image of FIG. 16 also, latest saved function, number of saved functions and latest date and time of saving are shown, as in FIG. 15.

Figure 17:
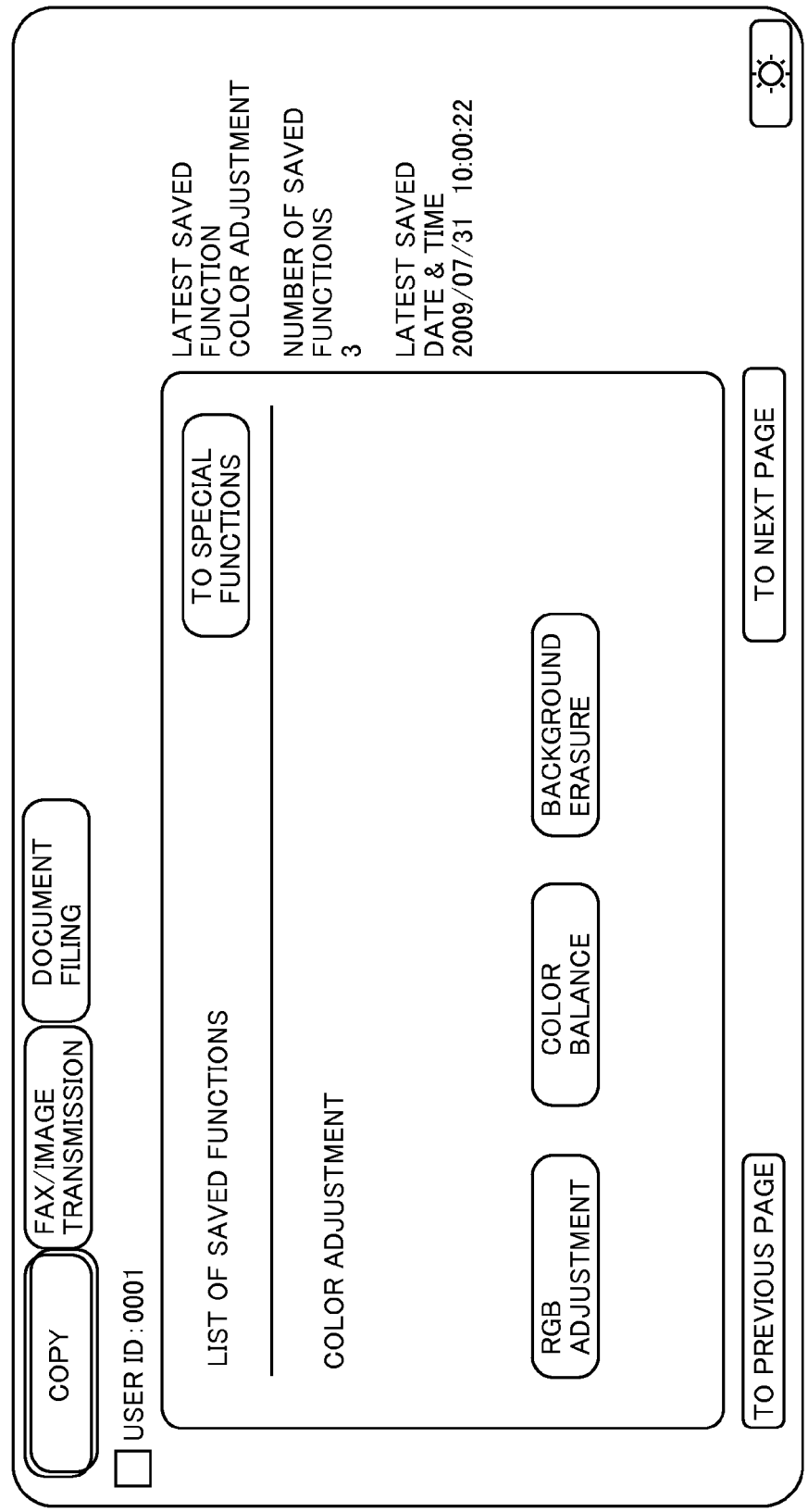
FIG. 17 shows a submenu function of a color adjustment function (selected from the list of saved functions shown in FIG. 16), for the copy function.

FIG. 17 shows an exemplary image displayed on display panel 172 when "color adjustment" button shown in FIG. 16 is pressed. Specifically, the image appears when the color adjustment function is designated in the small classification menu. The special function corresponds to the middle classification menu lower than the copy mode as the large classification. The color adjustment function corresponds to a small classification menu still lower than the special function. RGB adjustment function, color balance function and background erasure function correspond to minute classification menu still lower than the color adjustment function. Referring to FIG. 17, here, these three functions of minute classification menu are displayed. FIG. 17 appears when the "color adjustment" button for selecting the saved color adjustment function is pressed in the saved function menu of FIG. 16. Since the menu of lower layer than the saved function is displayed, the caption "list of saved functions" is also displayed in this image. In this image also, latest saved function, number of saved functions and latest date and time of saving are shown.

Figure 18:
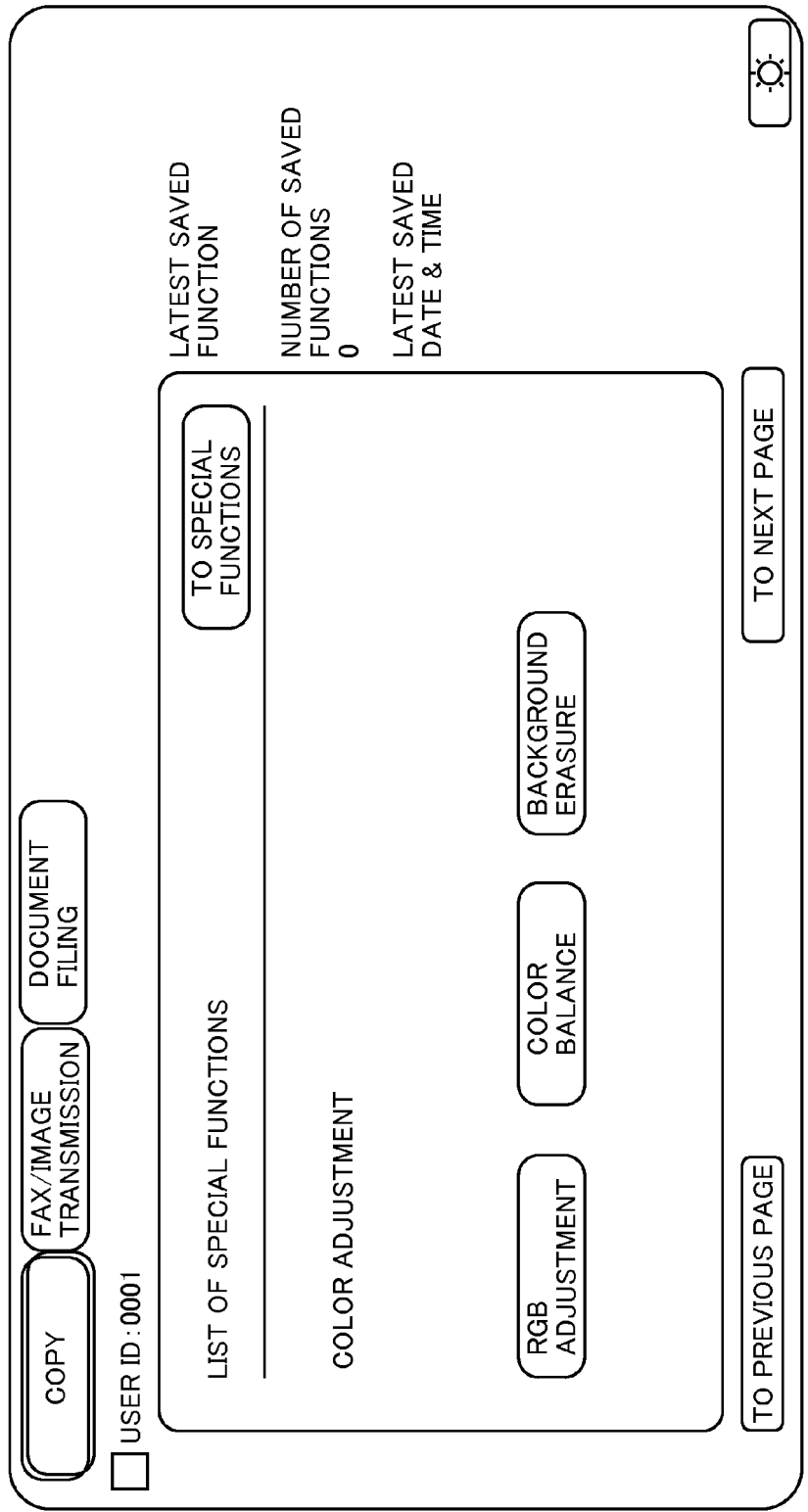
FIG. 18 shows a submenu image of a color adjustment function (selected from the list of non-saved functions shown in FIG. 13), for the copy function.

For comparison with FIG. 17, an exemplary image displayed on display panel 172 when "color adjustment" button shown in FIG. 13 is pressed is shown in FIG. 18. Specifically, FIG. 18 shows an image displayed when the color adjustment function is designated in the small classification menu. The middle classification as a lower layer of large classification=copy mode includes the special function. The small classification as a lower layer of the special function includes the color adjustment function. As the minute classification menu belonging to a still lower layer of the color adjustment function, RGB adjustment function, color balance function and background erasure function are displayed as shown in FIG. 18. FIG. 18 shows an image displayed when the "color balance adjustment" button, which corresponds to a not-saved function shown in FIG. 13, is pressed. Therefore, a caption "list of special functions" is displayed as shown in FIG. 18 (not the caption "list of saved functions").

From the comparison between FIGS. 17 and 18, it can be seen that RGB adjustment function, color balance function and background erasure function are similarly displayed as minute classification menu of the lower layer of color adjustment function (small classification menu). Specifically, if the color adjustment function (small classification menu) is saved, RGB adjustment function, color balance function and background erasure function as the minute classification menu of the lower layer are also saved together, and displayed as a submenu of the lower layer. This is because CPU 300 processes the function to be saved together with the functions of its lower layer based on the data stored as "submenu saved together" in the function management table of FIG. 5. By such processing, the trouble of saving a function of upper layer (small classification menu) only and leaving functions of lower layer (minute classification menu) in the original function selection menu can be avoided. Therefore, even when the "color adjustment" function is saved to saved functions, once the "color adjustment function" is selected from the saved functions, "RGB adjustment," "color balance" and "background erasure" as the lower functions saved are displayed in the hierarchical manner as in the original function selection menu. Therefore, it is possible for the user to easily select the minute classification menu.

It may be possible not to provide the field of "submenu saved together" shown in FIG. 5 and instead to store the hierarchy of functions as in the function use table (FIG. 4), and when a function of a specific layer is to be saved, functions of the layers lower than the specific layer are saved together (the same applies to the restore).

Assume that the logged-in user designates the "color adjustment" function of the list of saved functions shown in FIG. 16, as a desired function. At this time, when the user pressed the "color adjustment" button displayed on display panel 172, "color adjustment" is set to the designated state (indicated by double frames) as shown in FIG. 16, and as shown in FIG. 17, a submenu selection image for the color adjustment function is displayed on display panel 172. The user may designate any of the "RGB adjustment," "color balance" and "background erasure" functions displayed as the minute classification menu (YES at S1060). In the following, it is assumed that this designation of the "color adjustment" function saved as the saved function is the fifth designation made by different users.

If the logged-in user designates the "color adjustment" function of the original function selection menu (list of special functions) shown in FIG. 13, he/she pressed the "color adjustment" button displayed on display panel 172. Then, "color adjustment" is set to the designated state (indicated by double frames) as shown in FIG. 18. Further, as shown in FIG. 18, a submenu selection image for the color adjustment function is displayed on display panel 172. The user may designate any of the "RGB adjustment," "color balance" and "background erasure" functions displayed as the minute classification menu (YES at S1060).

Then, "color adjustment" designated by the logged-in user is written as a used function in the function use table (FIG. 4), together with the date and time of use and the used user ID (S1070). Here, it follows that the use history of "color adjustment" function contains records of designation by five different users after the "color adjustment" function was saved (after the date and time of saving). By way of example, the use history of "color adjustment" (having the function ID of "C0102") is as follows.

On 2009/08/21, 09:45:30, used by user 0001,
On 2009/08/17, 16:02:13, used by user 0021,
On 2009/08/16, 13:37:27, used by user 0031,
On 2009/08/13, 09:52:55, used by user 0041 and
On 2009/08/04, 11:25:22, used by user 0051.

A further preceding date and time of use is more than one month older than the date and time when the "color adjustment" function was saved, assumed to be Jul. 31, 2009 here. For example, the preceding date may be Jun. 30, 2009.

In such a situation, the function that has been saved (in the example above, the "color adjustment" function) is designated as the function to be used by the user (YES at S1200), and the auto-restore conditions are satisfied (YES at S1210). Therefore, the function restore confirmation image shown in FIG. 19 is displayed on display panel 172 (S1230). As shown in FIG. 19, the function to be restored "color adjustment" is displayed together with the message "THE FUNCTION BELOW DESIGNATED TO BE USED IN THE PRESENT JOB SATISFIES RESTORE CONDITIONS (5 DESIGNATIONS BY DIFFERENT USERS). DO YOU WANT TO RESTORE THE FUNCTION AS FREQUENTLY USED FUNCTION?" Further, "YES: RESTORE" button and "NO:

NOT RESTORE (KEEP SAVED)" button are displayed. If the logged-in user presses "YES: RESTORE" button (YES at S1240), "0" is stored in the flag of "color adjustment" in the function management table (FIG. 5). Thus, the "color adjustment function" comes to be displayed not in the list of saved functions shown in FIG. 16 but in the list of special functions shown in FIG. 13.

Thereafter, the color adjustment process is done, and the desired image data is formed on a sheet of recording paper (S1090).

Figure 20:
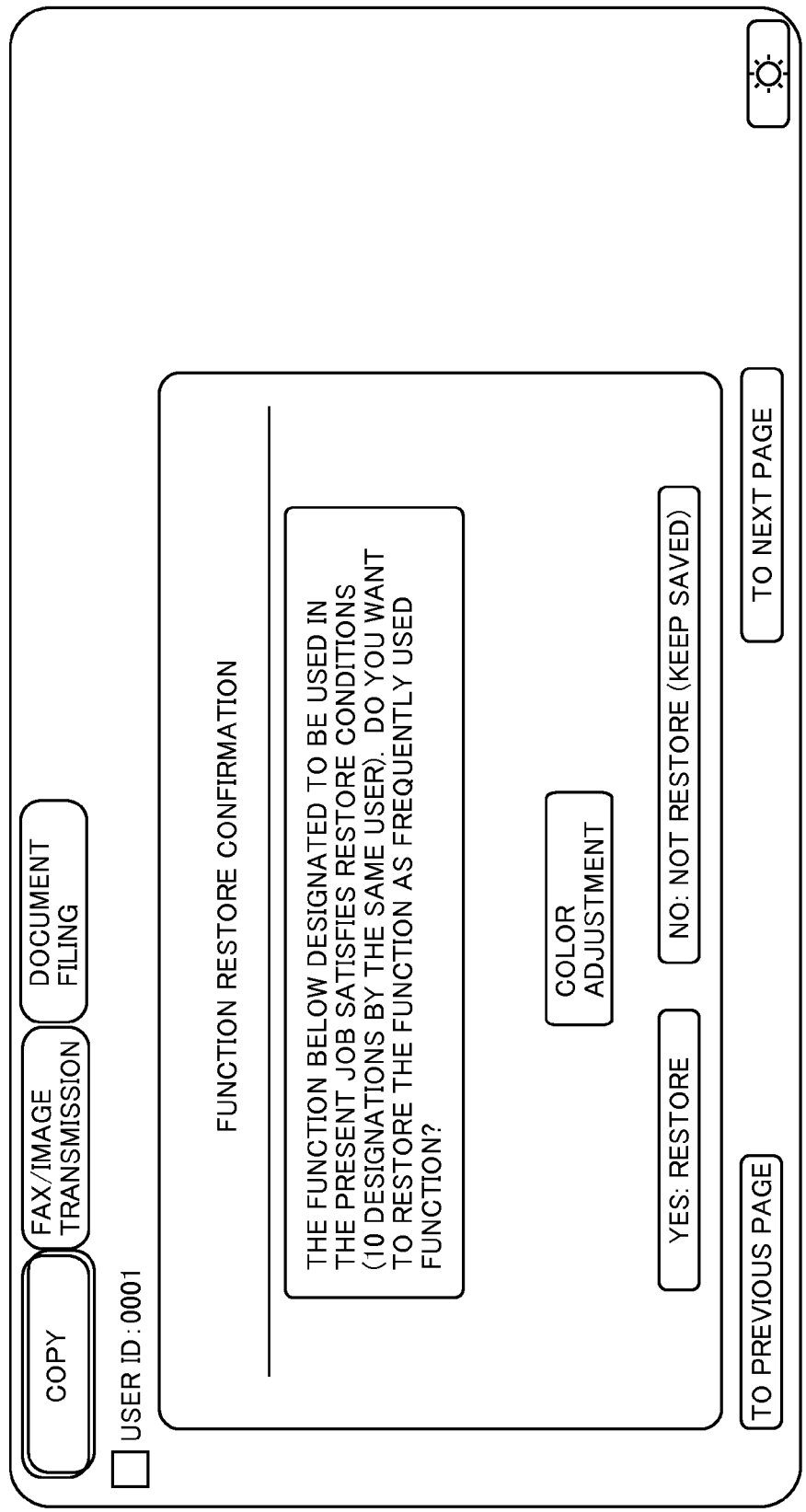

It is also possible that when a saved function is designated by a user as a function to be used (YES at S1200), other auto-restore conditions are satisfied (YES at S1220). In that case, the function restore confirmation image shown in FIG. 20 is displayed on display panel 172 (S1230). As shown in FIG. 20, the function to be restored "color adjustment" is displayed together with the message "THE FUNCTION BELOW DESIGNATED TO BE USED IN THE PRESENT JOB SATISFIES RESTORE CONDITIONS (10 DESIGNATIONS BY THE SAME USER). DO YOU WANT TO RESTORE THE FUNCTION AS FREQUENTLY USED FUNCTION?" Further, "YES: RESTORE" button and "NO: NOT RESTORE (KEEP SAVED)" button are displayed. If the logged-in user presses "YES: RESTORE" button (YES at S1240), "0" is stored in the flag of "color adjustment" in the function management table (FIG. 5). Thus, the "color adjustment function" comes to be displayed not in the list of saved functions shown in FIG. 16 but in the list of special functions shown in FIG. 13.

—Function Auto-Save Operation—

When 24 hours passed from the last function auto-save operation (YES at S1100), the function use table and the function management table are read (S1110). Any function having the flag "0" in the function management table of FIG. 5 and for which date and time of use in the last one month are not stored in the function use table of FIG. 4 is extracted (S1120). If such a function is not found, the process ends. Here, it is assumed that the color adjustment function is extracted.

Figure 21:
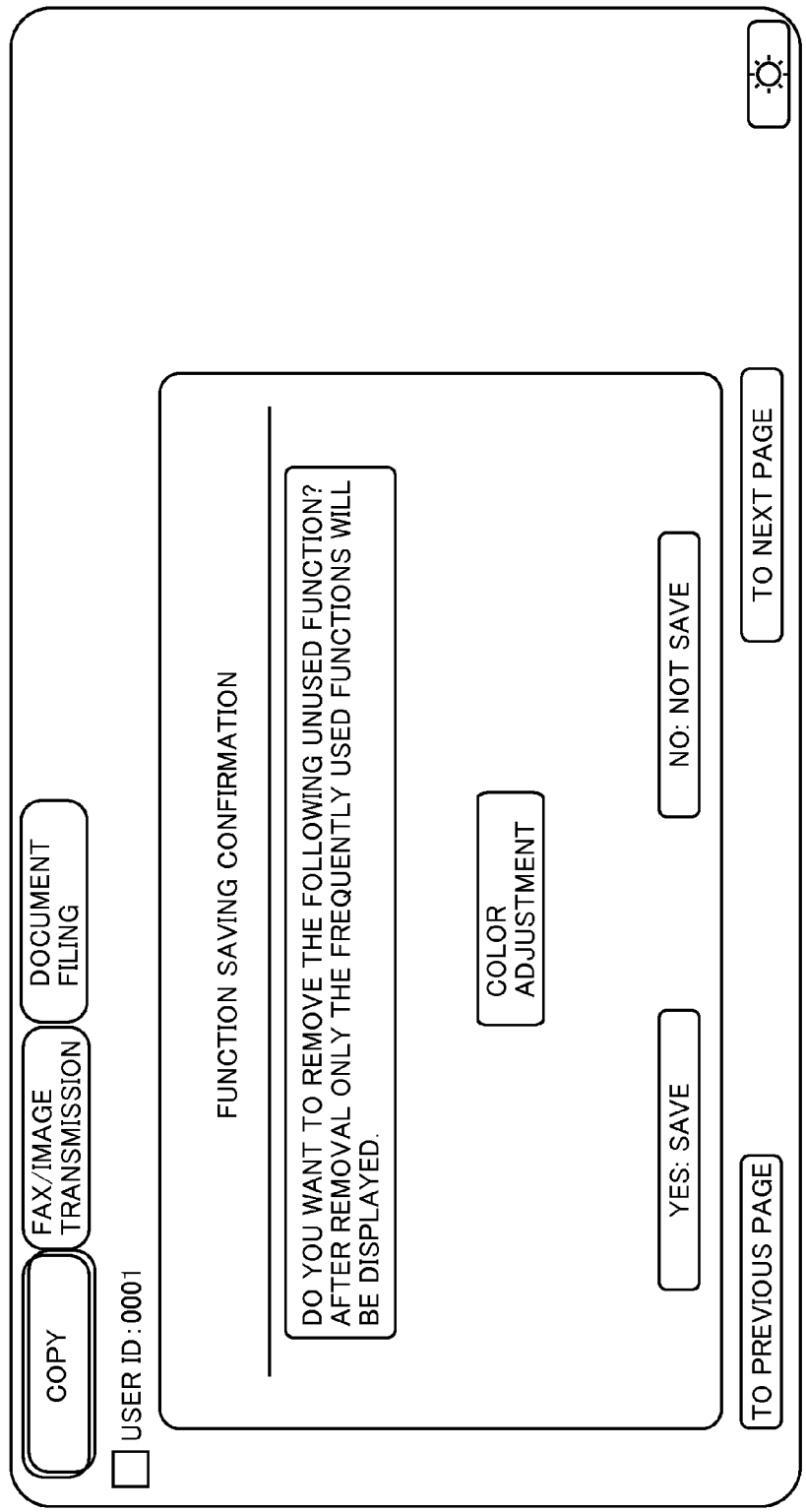
FIG. 21 shows an image for confirming a function saving.

Since there is an extracted function (YES at S1130), the function saving confirmation image shown in FIG. 21 is displayed on display panel 172 (S1140). As shown in FIG. 21, the function to be saved "color adjustment" is displayed together with a message "DO YOU WANT TO REMOVE THE FOLLOWING UNUSED FUNCTION? AFTER REMOVAL ONLY THE FREQUENTLY USED FUNCTIONS WILL BE DISPLAYED." Further, "YES: SAVE" button and "NO: NOT SAVE" button are displayed. If the logged-in user presses "YES: SAVE" button (YES at S1150), "1" is stored in the flag of "color adjustment" in the function management table (FIG. 5) (S1160). Thus, the "color adjustment function" comes to be displayed not in the list of special functions shown in FIG. 13 but in the list of saved functions shown in FIG. 16.

—Saved Function Resetting Operation—

Figure 22:
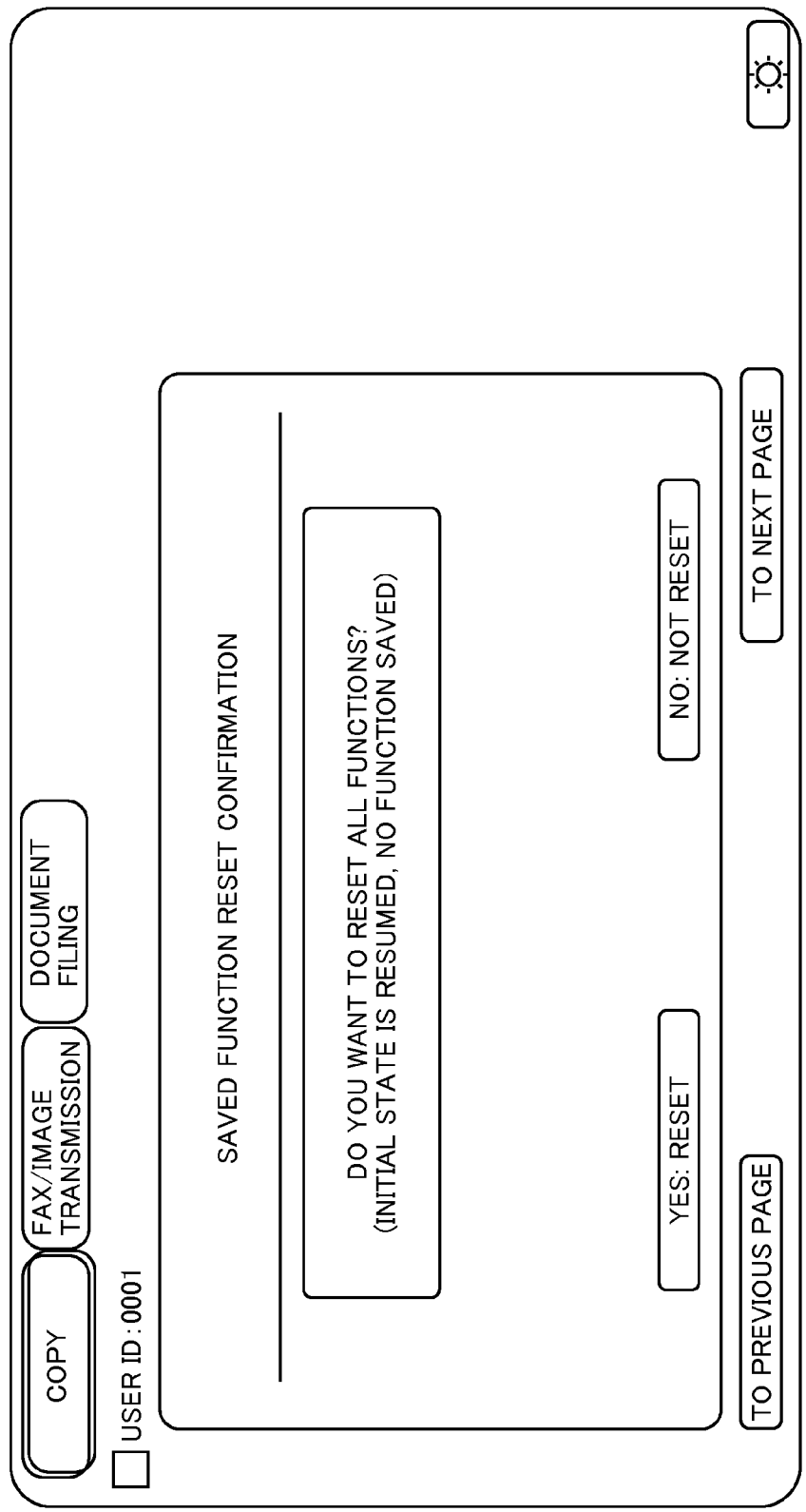
FIG. 22 shows an image for confirming resetting of saved functions.

A "saved function reset" button is displayed, for example, with the system setting image shown in FIG. 10. The system setting image can be operated only by the administrator. The process of "saved function reset" sets all the functions back to the initial state and no function is left saved. Thus, it involves a significant change in the system. Therefore, it is preferred that the "saved function reset" button is provided on the system setting image that can be operated only by the administrator. If the administrator pressed the "saved function reset" button (YES at S1300), the saved function reset confirmation button shown in FIG. 22 is displayed on display panel 172 (S1310). As shown in FIG. 22, a message "DO YOU WANT TO RESET ALL FUNCTIONS? (INITIAL STATE IS RESUMED, NO FUNCTION SAVED)" is displayed, together with "YES: RESET" button and "NO: NOT RESET" button. If the administrator presses "YES: RESET" button, "0" is stored in the flags of all functions in the function management table (FIG. 5) (S1330). As a result, all functions of image forming apparatus 150 come to be displayed in the list of special functions shown in FIG. 13. In the present embodiment, the display of "to saved functions" button in FIG. 13 disappears and, therefore, it becomes impossible to display the image of the list of saved functions on display panel 172. Even if the list of saved functions shown in FIG. 16 could be displayed, no function is displayed.

As described above, in the image forming apparatus in accordance with the present embodiment, (1) the user presses a button corresponding to a desired function from among a plurality of function selection buttons displayed, to designate a desired function; (2) in the image forming apparatus, even the function or functions displayed on the commonly used function selection menu are automatically saved if frequency of use is low; (3) if the function saved by the auto-save function is designated by a user as a desired function, the image forming apparatus restores the function to the original function selection menu image; and (4) if the user requests resetting of all functions, the image forming apparatus restores functions provided by the image forming apparatus to the original function selection menu. In this manner, in the image forming apparatus in accordance with the present embodiment, the manner of display of function selection menu image is changed based on the use history. As a result, when a desired function is to be selected from a plurality of function selection buttons, it is possible to easily select the desired function even various and many functions are provided by the image forming apparatus. Particularly, selection menu image of lower layers are maintained to have the same hierarchical structure before and after the saving. Therefore, confusion by the user before and after the saving can be prevented.

<Modifications>

In the embodiment described above, the following modifications may be made.

[Timing of Auto-Save Process]

In the embodiment described above, the timing when auto-save process shown in FIG. 7 is executed is a predetermined time period after the last auto-save process. The present invention, however, is not limited to such an embodiment. The timing may be when the image forming apparatus 150 is powered on, when a new log-in by a user is detected, when a user logs out, when a prescribed number of functions have been executed, or when log-in of an administrator is detected.

The auto-restore process shown in FIG. 8 is not limited to the above-described embodiment, either. The timing of auto-restore process may be those mentioned above (power on, new log-in, administrator log-in).

[Exchange of Image Forming Apparatus]

When the image forming apparatus 150 is exchanged (when it is changed to a new type), it may be desirable to maintain the saved functions in the new apparatus. In such a case, the function IDs and the flags of function management table shown in FIG. 5 are registered in the function management table of the new image forming apparatus. Alternatively, the function management table may be copied to the new image forming apparatus. As a prerequisite, the CPU of the new image forming apparatus must execute the flowchart, the menu system (menu hierarchy for selecting a function) must be the same, and the new image forming apparatus has all the functions of the old apparatus. If these conditions are satisfied, functions of low frequency of use are displayed as saved functions even in the new image forming apparatus. Therefore, even if the use history is not accumulated, it is possible for the user of the image forming apparatus to easily designate a desired function.

[Unit of Function to be Saved]

In the embodiment described above, the layers for selecting functions are maintained using classifications corresponding to hierarchical layers, that is, large classification, middle classification, small classification and minute classification for selecting a function. Any unit of classification may be used for saving, provided that the layer from which the function is selected is the same in the non-saved function selection menu and the saved function selection menu.

[Unit of Function to be Restored]

In the embodiment described above, saved state is reset and all functions are collectively returned to the initial state. It is possible in "list of saved functions" shown in FIG. 16, to display "individual restore" button, together with a button for selecting a saved function. When a saved function is selected and the "individual restore" button is pressed, the saved function can be restored one by one to the original function selection menu.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus having a plurality of functions and executing a function designated from said plurality of functions, comprising:
    a display device displaying a function selection image allowing a user to designate any of said plurality of functions, said display device displaying a first group of functions of which frequency of use is higher than a prescribed threshold value, and a second group of functions of which frequency of use is not higher than said threshold value, on mutually different function selection images, with a display item indicating that functions are displayed distinguished from each other;
    a designating device, connected to said display device, for receiving a user input designating any of the plurality of functions displayed by said display device;
    an extracting unit for extracting, from the first group of functions, a function to be moved to the second group of functions, while maintaining a function saved in the second group of functions prior to the extraction, in the second group of functions, when a predetermined condition is met;
    an image forming unit, connected to said designating device, for executing the function designated by the input received by said designating device;
    a changing device changing, when any of the functions belonging to said second group is designated by said designating device, a manner of display of said display device to have the function displayed together with the functions belonging to said first group; and
    an authentication device for authentication of a user who uses said image forming apparatus, wherein
    said changing device includes,
    a first restoring device, when a function belonging to said second group is designated by said designating device, for restoring the function to said first group based on whether the number of designations of said function by a specific user using said designating device is equal to or greater than a first number, and
    a second restoring device, when a function belonging to said second group is designated by said designating device, for restoring the function to said first group based on whether the number of designations of said function by a specific unspecified users using said designating device is equal to or greater than a second number, said second number being smaller than said first number.

2. The image forming apparatus according to claim 1, wherein said display item includes a UI component allowing transition from the function selection image displaying functions of said first group to the function selection image displaying functions of said second group.

3. The image forming apparatus according to claim 2, wherein the further comprising:
    a changing device changing, when a function belonging to said second group is designated on said function selection image by said designating device, a manner of display of said display device to have the function displayed together with the functions belonging to said first group.

4. The image forming apparatus according to claim 1, wherein said display device displays said plurality of functions, with higher priority to the functions of said first group than the functions of said second group.

5. The image forming apparatus according to claim 4, wherein said display device includes a device controlling menu transition such that the function selection image of the functions belonging to said second group can be reached only after the function selection image of the functions belonging to said first group is reached.

6. The image forming apparatus according to claim 4, further comprising:
    a changing device changing, when any of the functions belonging to said second group is designated by said designating device, a manner of display of said display device to have the function displayed together with the functions belonging to said first group.

7. The image forming apparatus according to claim 1, further comprising:
    a confirming device receiving, when a function belonging to said second group is designated by said designating device, a confirmation input of a user approval on movement of said function to said first group; wherein
    said changing device includes a function moving device moving, when a confirmation input of a user is received by the confirming device, the function designated by said designating device to said first group.

8. The image forming apparatus according to claim 1, further comprising:
    a history storage device storing a history of designation of said plurality of functions by said designating device;
    a frequency calculating device calculating, in accordance with the history stored in said history storage device, frequency of designation of each of the functions belonging to said first group in a prescribed time period; and
    an auto saving device automatically saving any function belonging to said first group of which frequency calculated by said frequency calculating device is not higher than said threshold value to said second group.

9. The image forming apparatus according to claim 8, wherein
    a hierarchical structure is defined among said plurality of functions;

said display device makes transition of functions displayed on said function selection image in accordance with said hierarchical structure; and when a function belonging to said first group is saved to said second group, said auto saving device saves a function belonging to a lower layer of said function in said hierarchical structure to said second group, maintaining the hierarchical structure between said function and the function belonging to the lower layer of said function.

10. In an image forming apparatus having a plurality of functions and executing a function designated from said plurality of functions, a method of displaying a function selection image, comprising the steps of:

displaying a function selection image allowing a user to designate any of said plurality of functions, said display step displaying a first group of functions of which frequency of use is higher than a prescribed threshold value, and a second group of functions of which frequency of use is not higher than said threshold value, on mutually different function selection images, with a display item indicating that functions are displayed distinguished from each other;

receiving a user input designating any of the plurality of functions displayed at said display step;

extracting, from the first group of functions, a function to be moved to the second group of functions, while maintaining a function saved in the second group of functions prior to the extraction, in the second group of functions, when a predetermined condition is met; and executing the function designated by the input received at said receiving step and forming an image on a recording medium; and changing, when a function belonging to said second group is designated on said first function selection image at said receiving step, a manner of display of said display device to have the function displayed together with the functions belonging to said first group, wherein said changing step includes, the step of restoring the function to said first group, when a function belonging to said second group is designated at said receiving step, based on whether the number of designations of said function by a specific user in said receiving step is equal to or greater than a first number, and the step of restoring the function to said first group, when a function belonging to said second group is designated by said receiving step, based on whether the number of designations of said function by unspecified users in said receiving step is equal to or greater than a second number, said second number being smaller than said first number.

11. The method according to claim 10, wherein said display item includes a UI component allowing transition from the function selection image displaying functions of said first group to the function selection image displaying functions of said second group.

12. The method according to claim 10, further comprising the steps of:

storing a history of designation of said plurality of functions at said receiving step, in a storage device;

calculating, in accordance with the history stored in said history storage device, frequency of designation of each of the functions belonging to said first group in a prescribed time period; and saving any function belonging to said first group of which frequency calculated at said calculating step is not higher than said threshold value to said second group.

13. The method according to claim 12, wherein a hierarchical structure is defined among said plurality of functions;

at said display step, functions displayed on said function selection image are subjected to transition in accordance with said hierarchical structure; and at said saving step, a function belonging to a lower layer of said function in said hierarchical structure to said second group is saved, maintaining the hierarchical structure between said function and the function belonging to the lower layer of said function.

14. The image forming apparatus according to claim 1, wherein the predetermined condition is met when the function in the first group of functions is not used for a predetermined period of time.

* * * * *